(12) United States Patent
Höglund et al.

(10) Patent No.: US 11,382,137 B2
(45) Date of Patent: Jul. 5, 2022

(54) MOBILE-TERMINATED EARLY DATA TRANSMISSION

(71) Applicant: Telefonaktiebolaget LM Ericsson (publ), Stockholm (SE)

(72) Inventors: Andreas Höglund, Solna (SE); Dung Pham Van, Upplands Väsby (SE); Tuomas Tirronen, Helsinki (FI); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/755,417

(22) PCT Filed: Oct. 10, 2018

(86) PCT No.: PCT/SE2018/051041
§ 371 (c)(1),
(2) Date: Apr. 10, 2020

(87) PCT Pub. No.: WO2019/074436
PCT Pub. Date: Apr. 18, 2019

(65) Prior Publication Data
US 2020/0245370 A1 Jul. 30, 2020

Related U.S. Application Data

(60) Provisional application No. 62/570,634, filed on Oct. 10, 2017.

(51) Int. Cl.
*H04W 74/08* (2009.01)
*H04W 4/70* (2018.01)
(Continued)

(52) U.S. Cl.
CPC ......... *H04W 74/0833* (2013.01); *H04W 4/70* (2018.02); *H04W 8/24* (2013.01); *H04W 76/10* (2018.02)

(58) Field of Classification Search
CPC ..... H04W 74/0833; H04W 4/70; H04W 8/24; H04W 76/10
(Continued)

(56) References Cited

U.S. PATENT DOCUMENTS 8,644,129 B2   2/2014   Dinan
2013/0083753 A1   4/2013   Lee et al.
(Continued)

FOREIGN PATENT DOCUMENTS

EP   2375848 A1   10/2011
WO   2008042889 A1   4/2008
(Continued)

OTHER PUBLICATIONS

Unknown, Author, "3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.4.0, Sep. 2017, pp. 1-108.
(Continued)

*Primary Examiner* — Congvan Tran
(74) *Attorney, Agent, or Firm* — Murphy, Bilak & Homiller, PLLC

(57) ABSTRACT

A wireless device (14) is configured for use in a wireless communication system. The wireless device (14) is configured to transmit signaling (18A, 18C) 5 indicating whether or not the wireless device (14) is capable of receiving user data during a random access procedure (20). The signaling may for instance indicate whether or not the wireless device (14) is capable of receiving user data over a user plane during a random access procedure (20), e.g., by indicating whether or not the wireless device (14) supports early data for cellular internet of things, CIoT, Evolved 10 Packet System, EPS, user plane (UP) optimization. Regardless, the
(Continued)

wireless device (14) may also receive user data during the random access procedure (20) in accordance with said signaling.

18 Claims, 21 Drawing Sheets

(51) Int. Cl.
*H04W 76/10* (2018.01)
*H04W 8/24* (2009.01)

(58) Field of Classification Search
USPC .......................................................... 370/329
See application file for complete search history.

(56) References Cited

U.S. PATENT DOCUMENTS

| | | | |
|---|---|---|---|
| 2017/0353976 A1* | 12/2017 | Yerramalli | H04L 5/0057 |
| 2018/0098358 A1* | 4/2018 | Rico Alvarino | H04W 72/0453 |
| 2018/0109976 A1* | 4/2018 | Ly | H04L 1/005 |
| 2018/0220338 A1* | 8/2018 | Tabe | H04W 36/0027 |
| 2019/0081688 A1* | 3/2019 | Deenoo | H04B 7/088 |
| 2019/0159265 A1* | 5/2019 | Takeda | H04W 28/06 |
| 2019/0166614 A1* | 5/2019 | Byun | H04L 1/0013 |
| 2019/0182682 A1* | 6/2019 | Kim | H04W 16/28 |

FOREIGN PATENT DOCUMENTS

| | | |
|---|---|---|
| WO | 2009025480 A1 | 2/2009 |
| WO | 2010027175 A2 | 3/2010 |
| WO | 2013020209 A1 | 2/2013 |
| WO | 2013177337 A1 | 11/2013 |
| WO | 2016048044 A1 | 3/2016 |
| WO | 2016161408 A1 | 10/2016 |

OTHER PUBLICATIONS

Unknown, Author, "3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.4.0, Sep. 2017, pp. 1-43.

Unknown, Author, "3rd Generation Partnership Project; Technical Specification Group Radio Access Network; Evolved Universal Terrestrial Radio Access (E-UTRA); Radio Resouice Control (RRC); Protocol specification (Release 14)", 3GPP TS 36.331 V14.4.0, Sep. 2017, pp. 1-753.

Unknown, Author, "3rd Generation Partnership Project; Technical Specification Group Services and System Aspects; 3GPP System Architecture Evolution (SAE); Security architecture (Release 15)", 3GPP TS 33.401 V15.1.0, Sep. 2017, pp. 1-161.

Unknown, Author, "LTE; Evolved Universal Terrestrial Radio Access (E-UTRA) and Evolved Universal Terrestrial Radio Access Network (E-UTRAN); Overall description; Stage 2 (3GPP TS 36.300 version 14.4.0 Release 14)", ETSI TS 136 300 V14.4.0, Oct. 2017, pp. 1-348.

Unknown, Author, "LTE: Evolved Universal Terrestrial Radio Access Network (E-UTRAN); S1 Application Protocol (S1AP) (3GPP TS 36.413 version 14.4.0 Release 14)", ETSI TS 136 413 V14.4.0, Oct. 2017, pp. 1-354.

Intel Corporation, "Early data transmission discussion for eFeMTC and FeNB-IoT", 3GPP TSG RAN WG2 Meeting #99bis, R2-1710642, Prague, Czech Republic, Oct. 9-13, 2017, 1-7.

Intel Corporation, "Early data transmission for feNB-IoT", 3GPP TSG RAN WG1 Meeting #90bis, R1-1717871, Prague, Czech Republic, Oct. 9-13, 2017, 1-3.

Kyocera, "Details of Early data transmission for eFeMTC", 3GPP TSG-RAN WG2 #99bis, R2-1710791, Prague, Czech Republic, Oct. 9-13, 2017, 1-5.

* cited by examiner

```
┌─────────────────────────────────────────────────────────────────┐
│ TRANSMITTING SIGNALLING INDICATING WHETHER OR NOT THE WIRELESS  │
│  DEVICE IS CAPABLE OF RECEIVING USER DATA DURING A RANDOM       │
│                       ACCESS PROCEDURE                          │
│                             300                                 │
└─────────────────────────────────────────────────────────────────┘
                                │
                                ▼
┌─────────────────────────────────────────────────────────────────┐
│      SELECTING A RANDOM ACCESS PREAMBLE FOR THE RANDOM ACCESS   │
│    PROCEDURE FROM AMONG A SET OF POSSIBLE RANDOM ACCESS         │
│    PREAMBLES THAT IS AGNOSTIC AS TO WHETHER OR NOT THE WIRELESS │
│    DEVICE IS CAPABLE OF RECEIVING USER DATA DURING THE RANDOM   │
│                       ACCESS PROCEDURE                          │
│                             302                                 │
└─────────────────────────────────────────────────────────────────┘
                                │
                                ▼
┌─────────────────────────────────────────────────────────────────┐
│  TRANSMITTING THE SELECTED RANDOM ACCESS PREAMBLE DURING THE    │
│                   RANDOM ACCESS PROCEDURE                       │
│                             304                                 │
└─────────────────────────────────────────────────────────────────┘
                                │
                                ▼
┌─────────────────────────────────────────────────────────────────┐
│  RECEIVING SIGNALING INDICATING USER DATA IS TO BE SENT OR IS   │
│  DESIRABLE TO BE SENT TO THE WIRELESS DEVICE DURING A RANDOM    │
│                       ACCESS PROCEDURE                          │
│                             306                                 │
└─────────────────────────────────────────────────────────────────┘
                                │
                                ▼
┌─────────────────────────────────────────────────────────────────┐
│  DURING THE RANDOM ACCESS PROCEDURE, TRANSMITTING AN RRC        │
│  MESSAGE (E.G., A CONNECTION REQUEST OR A CONNECTION RESUME     │
│     REQUEST) THAT EXCLUDES ANY UPLINK USER DATA                 │
│                             308                                 │
└─────────────────────────────────────────────────────────────────┘
                                │
                                ▼
┌─────────────────────────────────────────────────────────────────┐
│   MONITORING FOR RECEPTION OF USER DATA DURING THE RANDOM       │
│                       ACCESS PROCEDURE                          │
│                             310                                 │
└─────────────────────────────────────────────────────────────────┘
                                │
                                ▼
┌─────────────────────────────────────────────────────────────────┐
│    RECEIVING USER DATA DURING THE RANDOM ACCESS PROCEDURE IN    │
│              ACCORDANCE WITH SAID SIGNALLING                    │
│                             320                                 │
└─────────────────────────────────────────────────────────────────┘
```

*FIG. 3*

RECEIVING FROM A WIRELESS DEVICE SIGNALLING INDICATING WHETHER OR NOT THE WIRELESS DEVICE IS CAPABLE OF RECEIVING USER DATA DURING A RANDOM ACCESS PROCEDURE
500

STORING, IN A CONTEXT FOR THE WIRELESS DEVICE AT THE CORE NETWORK NODE, INFORMATION INDICATING WHETHER OR NOT THE WIRELESS DEVICE IS CAPABLE OF RECEIVING USER DATA DURING A RANDOM ACCESS PROCEDURE, IN ACCORDANCE WITH THE RECEIVED SIGNALING
505

TRANSMITTING TO A RADIO NETWORK NODE SIGNALLING INDICATING WHETHER OR NOT A WIRELESS DEVICE IS CAPABLE OF RECEIVING USER DATA DURING A RANDOM ACCESS PROCEDURE
510

*FIG. 5*

MOBILE-TERMINATED EARLY DATA TRANSMISSION

BACKGROUND

A wireless device traditionally transmits and/or receives user data only after having performed random access and established a control plane connection with a wireless communication network. Allowing a wireless device to transmit and/or receive user data earlier in time may reduce wireless device power consumption and data latency, especially where the amount of user data is small. A so-called early data transmission (EDT) approach in this regard allows a wireless device to transmit and/or receive user data even as early as during the random access procedure, e.g., transmit user data in the third message and/or receive user data in the fourth message of a four-step random access procedure.

Control signaling overhead, however, threatens full realization of EDT benefits.

SUMMARY

According to some embodiments herein, a wireless device transmits signaling indicating that the wireless device is capable of receiving user data during a random access procedure, e.g., that it supports early data for cellular internet of things (CIoT) Evolved Packet System (EPS) user plane optimization. The wireless device may for instance transmit the signaling in a radio resource control (RRC) message and/or during or upon an initial attach procedure. In some embodiments, this signaling may be transmitted or propagated to a core network node (e.g., configured to perform mobility management for the wireless device) for storage in a context for the wireless device. The core network node may thereafter transmit signaling to a radio network node indicating whether the wireless device is capable of receiving user data during a random access procedure, in accordance with the device's context.

The radio network node may thereby become aware that a wireless device is so capable, and transmit user data to the wireless device during the random access procedure without risk that the user data transmission goes unused and radio resources go wasted due wireless device incapability. Moreover, signaling the device capability in this way, especially when stored in the device's context, may prove advantageous from a control overhead perspective.

More particularly, embodiments herein include a method performed by a wireless device configured for use in a wireless communication system. The method comprises transmitting signaling indicating whether or not the wireless device is capable of receiving user data during a random access procedure. In some embodiments, for example, the signaling indicates that the wireless device is capable of receiving user data during a random access procedure. In some embodiments, the method further comprises receiving user data during the random access procedure in accordance with said signaling.

More particularly, embodiments herein include a method performed by a wireless device configured for use in a wireless communication system. The method comprises transmitting signaling indicating that the wireless device is capable of receiving user data during a random access procedure. In some embodiments, for example, the signaling indicates that the wireless device is capable of receiving user data during a random access procedure. In some embodiments, the method further comprises receiving user data during the random access procedure in accordance with said signaling.

In some embodiments, the method further comprises, based on indicating that the wireless device is capable of receiving user data during the random access procedure, monitoring for reception of user data during the random access procedure.

In some embodiments, the method comprises transmitting the signaling in a radio resource control, RRC, message.

In some embodiments, the method comprises transmitting the signaling to a base station in a radio resource control, RRC, message of the random access procedure, wherein the RRC message is a RRC connection request message or an RRC connection resume request message.

In some embodiments, the method comprises transmitting the signaling to a core network node in a core network of the wireless communication system during or upon an initial attach procedure for the wireless device to attach to the wireless communication system.

In some embodiments, the method further comprises selecting a random access preamble for the random access procedure from among a set of possible random access preambles that is agnostic as to whether or not the wireless device is capable of receiving user data during the random access procedure, and transmitting the selected random access preamble during the random access procedure.

In some embodiments, the method further comprises receiving signaling indicating user data is to be sent or is desirable to be sent to the wireless device during a random access procedure.

In some embodiments, the method further comprises, during the random access procedure, transmitting a radio resource control (RRC) message that excludes any uplink user data, wherein the RRC message is an RRC connection resume request message or an RRC connection request message.

In some embodiments, the wireless device is a narrowband internet-of-thing (NB-IoT) device or an enhanced machine type communication (eMTC) device.

In some embodiments, the signaling indicates whether or not the wireless device is capable of receiving user data over a user plane during a random access procedure.

In some embodiments, the signaling indicates whether or not the wireless device is capable of receiving user data over a user plane during a random access procedure by indicating whether or not the wireless device supports early data for cellular internet of things, CIoT, Evolved Packet System, EPS, user plane (UP) optimization.

Embodiments herein also include a method performed by a network node configured for use in a wireless communication system. The method comprises receiving signaling indicating whether or not a wireless device is capable of receiving user data during a random access procedure.

In some embodiments, the network node is a radio network node. The method may further comprise, responsive to the signaling indicating the wireless device is capable of receiving user data during a random access procedure, transmitting user data to the wireless device during a random access procedure.

In some embodiments, said receiving comprises receiving the signalling from the wireless device in a radio resource control (RRC) message.

In some embodiments, said receiving comprises receiving the signaling from the wireless device in a radio resource control (RRC) message of the random access procedure, wherein the RRC message is a RRC connection request message or an RRC connection resume request message.

In some embodiments, the network node is a radio network node. Said receiving may comprise receiving the signaling from a core network node in a core network of the wireless communication system.

In some embodiments, the method may further comprise transmitting signaling indicating user data is to be sent or is desirable to be sent to the wireless device during a random access procedure.

In some embodiments, the network node is a radio network node. The method may further comprise during the random access procedure receiving from the wireless device a radio resource control (RRC) message that excludes any uplink user data, wherein the RRC message is an RRC connection resume request message or an RRC connection request message.

In some embodiments, the wireless device is a narrowband internet-of-thing (NB-IoT) device or an enhanced machine type communication (eMTC) device.

In some embodiments, the signalling indicates whether or not the wireless device is capable of receiving user data over a user plane during a random access procedure.

In some embodiments, the signalling indicates whether or not the wireless device is capable of receiving user data over a user plane during a random access procedure by indicating whether the wireless device supports early data for cellular internet of things, CIoT, Evolved Packet System, EPS, user plane (UP) optimization.

Embodiments herein further include a method performed by a core network node configured for use in a wireless communication system. The method comprises transmitting to a radio network node signaling indicating whether or not a wireless device is capable of receiving user data during a random access procedure.

In some embodiments, the method further comprises receiving signaling indicating whether or not the wireless device is capable of receiving user data during a random access procedure; and storing, in a context for the wireless device at the core network node, information indicating whether or not the wireless device is capable of receiving user data during a random access procedure, in accordance with the received signaling. In some embodiments, the signaling transmitted indicates whether or not the wireless device is capable of receiving user data during a random access procedure, in accordance with the stored information.

In some embodiments, the received signaling is received during or upon an initial attach procedure for the wireless device to attach to the wireless communication system.

In some embodiments, the method comprises transmitting the signaling during a retrieve wireless device information procedure in which the radio network node retrieves information about the wireless device from the core network node or a wireless device context resume procedure performed by the radio network node with the core network node for resuming a context of the wireless device.

In some embodiments, the wireless device is a narrowband internet-of-thing (NB-IoT) device or an enhanced machine type communication (eMTC) device.

In some embodiments, the signalling indicates whether or not the wireless device is capable of receiving user data over a user plane during a random access procedure.

In some embodiments, the signalling indicates whether or not the wireless device is capable of receiving user data over a user plane during a random access procedure by indicating whether the wireless device supports early data for cellular internet of things, CIoT, Evolved Packet System, EPS, user plane (UP) optimization.

Embodiments herein also include corresponding apparatus, computer programs, and carriers (e.g., non-transitory computer-readable mediums).

For example, embodiments herein include a wireless device configured for use in a wireless communication system. The wireless device is configured (e.g., via communication circuitry and processing circuitry) to transmit signaling indicating whether or not the wireless device is capable of receiving user data during a random access procedure.

For example, embodiments herein include a wireless device configured for use in a wireless communication system. The wireless device is configured (e.g., via communication circuitry and processing circuitry) to transmit signaling indicating that the wireless device is capable of receiving user data during a random access procedure.

Embodiments also include a network node configured for use in a wireless communication system. The network node is configured (e.g., via communication circuitry and processing circuitry) to receive signaling indicating whether or not a wireless device is capable of receiving user data during a random access procedure.

Embodiments further include a core network node configured for use in a wireless communication system. The core network node is configured to transmit to a radio network node signaling indicating whether or not a wireless device is capable of receiving user data during a random access procedure.

BRIEF DESCRIPTION OF THE DRAWINGS

FIG. 3 is a logic flow diagram of a method performed by a wireless device according to some embodiments.

FIG. 5 is a logic flow diagram of a method performed by a core network node according to some embodiments.

DETAILED DESCRIPTION

Figure 1:
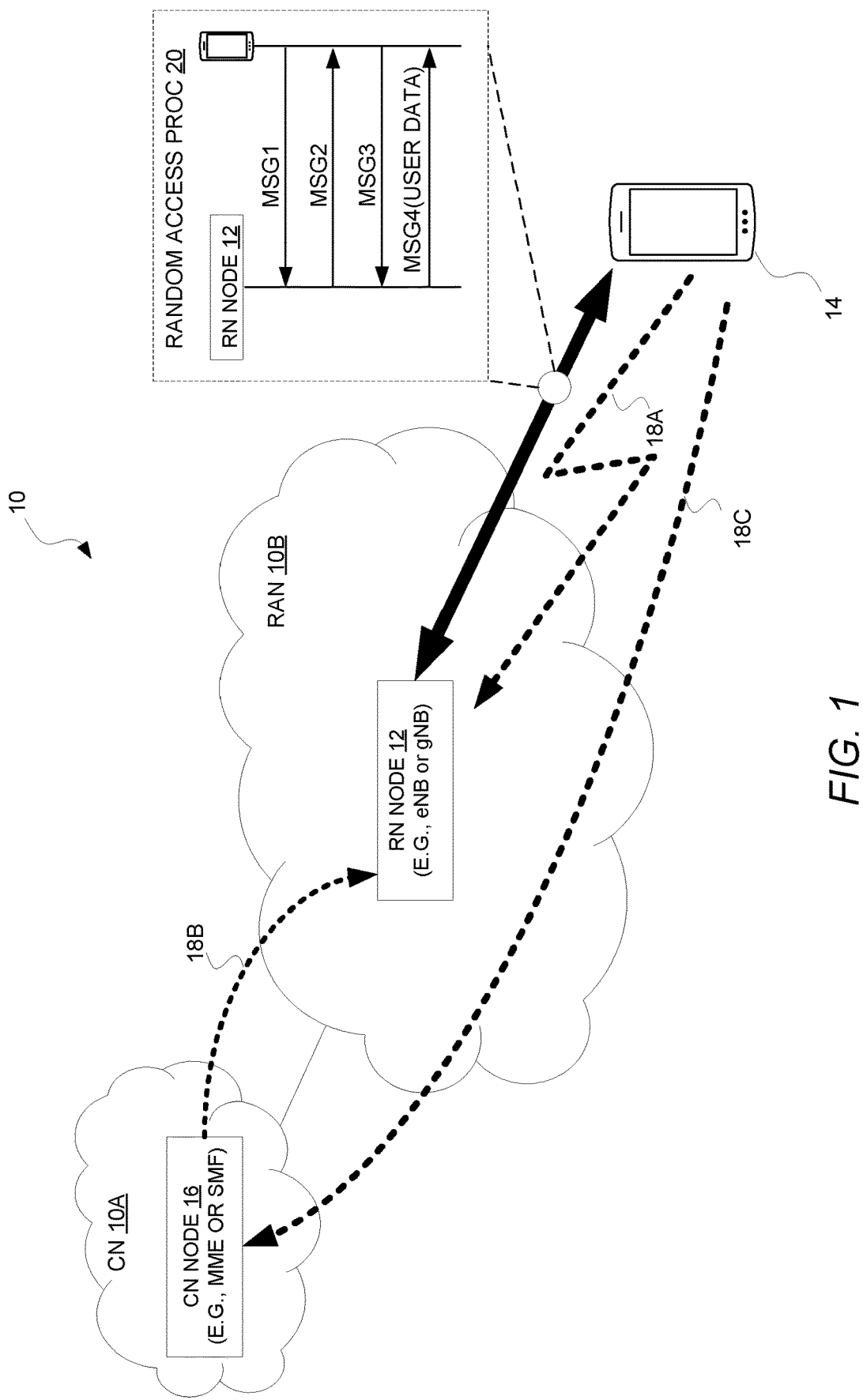
FIG. 1 is a block diagram of a wireless communication system according to some embodiments.

FIG. 1 shows a wireless communication system 10 (e.g., a NB-IoT, eMTC, or 5G system) according to some embodiments. The system 10 includes a core network (CN) 10A and a radio access network (RAN) 10B. The RAN 10B includes one or more radio network nodes 12 (e.g., one or more base stations, such as an eNodeB or gNodeB) for providing radio access to wireless communication devices 14, one of which is shown. Via this radio access, a wireless communication device 14 (also referred to simply as 'wireless device') connects to the CN 10A, which in turn may provide the wireless communication device 14 with access to one or more external networks, such as the Internet. The CN 10A for example may include different CN nodes, one of which is shown as CN node 16. CN node 16 may be for instance a mobility management entity (MME) or a node implementing a session management function, SMF.

According to some embodiments, a wireless device 14 is configured to engage in a random access procedure 20 with a radio network node 12, e.g., in order to acquire uplink timing and/or establish a radio resource control (RRC) connection. FIG. 1 for example shows this random access procedure 20 as a contention-based procedure having four steps corresponding to four messages. In the first message shown, MSG1, the wireless device 12 transmits a random access preamble to the radio network node 12, e.g., on a (narrowband) random access channel, (N)PRACH. Via the second message shown, MSG2, the radio network node 12 in response transmits a random access response (RAR) that includes a timing advance value for the wireless device's uplink timing, includes an identity that the wireless device is to use for further communication, and includes an uplink grant assigning an initial resource to the wireless device 12. The third message, MSG3, may constitute an RRC connection request message or an RRC connection resume request message. Regardless, MSG3 includes a contention resolution identity (e.g., a temporary mobile subscriber identity, TMSI) and includes a connection establishment cause as the reason why the device requests the RRC connection. Finally, the fourth messages, MSG4, is a contention resolution message (e.g., in the form of an RRC connection setup message) addressed towards the contention resolution identity from MSG3. This contention resolution message resolves contention that may have occurred between multiple wireless devices transmitting the same random access preamble. Although illustrated with the example of a contention-based random access procedure, though, embodiments herein also extend to contention-free random access procedures which may have only two steps.

No matter the particular nature of or number of steps in the random access procedure 20, the procedure 20 as a general matter may facilitate the establishment or resumption of a control plane connection, identities, timing, etc. for the later transfer of user data. That is, user data may generally be transferred between the radio network node 12 and the wireless device 14 (e.g., over a data channel) after the random access procedure 20 has been performed.

According to some embodiments, though, at least some wireless devices in the system 10 may be capable of receiving user data earlier, such as during the random access procedure 20 itself, so that the wireless device receives that user data earlier in time than if it were to receive the user data only after the random access procedure 20 completes. The wireless device may for instance receive the user data after MSG1 transmission but before the RRC connection setup or resumption is complete.

As shown in FIG. 1, for example, where the wireless device 14 is so capable, the wireless device 14 may receive user data in or in conjunction with MSG4 of the random access procedure 20, e.g., over the user plane or the control plane. In this regard, where the wireless device 14 receives the user data over the control plane via a downlink non-access stratum (NAS) protocol data unit (PDU), an RRC connection setup message constituting MSG4 of the random access procedure 20 may be multiplexed with an RRC message carrying the downlink NAS-PDU on a common control channel (CCCH). Where applied for or based on a solution for cellular internet-of-things (CIoT) in an Evolved Packet System (EPS), this may be referred to as early data transmission (EDT) for CIoT EPS control plane (CP) optimization or simply the CP solution. On the other hand, where the wireless device 14 receives the user data over the user plane, an RRC connection resume message constituting MSG4 of the random access procedure 20 may be multiplexed with downlink user data on a dedicated traffic channel (DTCH). Where applied for or based on a solution for CIoT in EPS, this may be referred to as EDT for CIoT EPS user plane (UP) optimization or simply the UP solution.

The wireless device 14 according to some embodiments notably transmits signaling indicating whether or not the wireless device 14 is capable of receiving user data during the random access procedure 20. This capability may also be referred to here as early data transmission (EDT) capability or simply early data capability. In some embodiments, the signaling indicates whether or not the wireless device 14 is capable of receiving user data over the control plane during the random access procedure 20, e.g., so as to indicate specifically whether the wireless device 14 supports EDT for CIoT EPS CP optimization. Alternatively or additionally, the signaling may indicate whether or not the wireless device 14b is capable of receiving user data over the user plane during the random access procedure 20, e.g., so as to indicate specifically whether the wireless device 14 supports EDT for CIoT EPS UP optimization. In these cases, then, the signaling may indicate separate capabilities regarding support for reception of user data over the control plane and support for reception of user data over the user plane. In still other embodiments, the signaling is common or agnostic as to the user plane or the control plane, e.g., such that a device with the indicated capability is or should be capable of both CP EDT and UP EDT.

In any event, by way of this capability signaling, the radio network node 12 may become aware of the device's capability or lack thereof. Accordingly, if the signaling indicates that the wireless device 14 is capable of receiving user data during the random access procedure 20, the radio network node 12 may transmit user data to the wireless device 14 during the random access procedure 20, e.g., without risk that the user data transmission goes unreceived and radio resources go wasted due wireless device incapability.

FIG. 1 more particularly shows that the wireless device 14 in some embodiments transmits the capability signaling in the form of signaling 18A to the radio network node 12. The signaling 18A may for instance comprise or be included in an RRC message. In fact, in one embodiment, the wireless device 14 transmits the signaling 18A in an RRC message of the random access procedure 20 itself. The signaling 18A may for instance be included in MSG3 of the random access procedure 20, e.g., as a one-bit flag. In these and other embodiments, the signaling 18A may indicate whether the wireless device 14 is capable of receiving user data over the user plane or the control plane during the random access procedure 20. For instance, in some embodiments, the wireless device 14 indicates that it is capable of receiving user data over the control plane during the random access procedure 20 by including the one-bit flag in an RRC connection request message as MSG3, whereas the wireless device 14 indicates that it is capable of receiving user data over the user plane during the random access procedure 20 by including the one-bit flag in an RRC connection resume request message as MSG3.

In another embodiment, the wireless device 14 transmits the signaling 18A to the radio network node 12 (e.g., in an RRC message) during or upon completion of an initial attach procedure for the wireless device 14 to attach to the system 10. This initial attach procedure may be performed after the random access procedure 20. In this case, then, the capability indicated by the signaling 18A may be exploited other times when the wireless device 14 engages in the random access procedure 20, in order for the radio network node 12 to transmit user data to the wireless device 14 during other executions of the random access procedure 20.

The radio network node 12 may effectively relay or otherwise propagate information indicating the signaled capability to the core network node 16 (via signaling not shown in FIG. 1). In these and other embodiments, the wireless device 14 may in some sense be said to effectively transmit signaling 18C to the core network node 16 (e.g., during or upon an attachment procedure) indicating whether or not the wireless device is capable of receiving user data during the random access procedure 20.

Regardless of how the core network node 16 is informed of the device's capability in this regard, though, the core network node 16 in some embodiments stores information indicating the device's capability, e.g., in a context for the wireless device 14. This way, the core network node 16 may later transmit signaling 18B to the radio network node 12 (or a different radio network node due to device mobility) indicating whether the wireless device 14 is capable of receiving user data during the random access procedure 20. The core network node 16 may do so for instance as part of a retrieve wireless device information procedure in which the radio network node retrieves information about the wireless device 14 from the core network node 16 or a wireless device context resume procedure performed by the radio network node with the core network node for resuming a context of the wireless device 14. In these and other embodiments, then the core network node 16 may transmit signal 18B as part of responding to a request from the radio network node 12 or a different radio network node for the device's context. This proves efficient from a control signaling overhead perspective since the capability information in this case would not need to be signaled over the radio interface (again).

Figure 2:
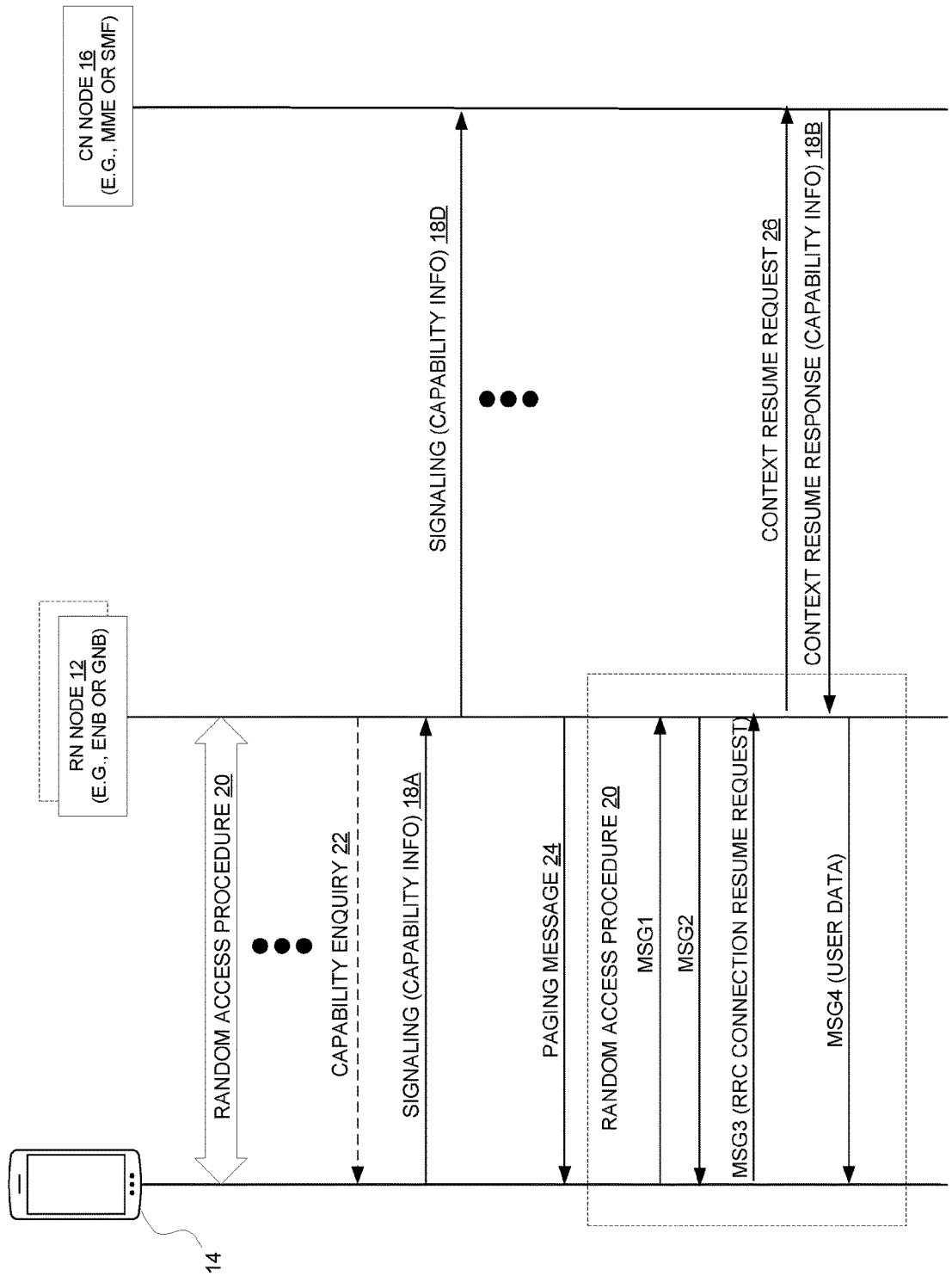
FIG. 2 is a call flow diagram of signaling for a wireless device to receive user data during a random access procedure according to some embodiments.

FIG. 2 illustrates additional details of one or more of these embodiments. As shown, the wireless device 14 performs a random access procedure 20 with a radio network node 12. At some point thereafter, such as an in response to a capability enquiry 22 from the radio network node 12 that may occur during or upon completion of an initial attach procedure, the wireless device 14 transmits signaling 18A (e.g., RRC signaling) to the radio network node 12 indicating whether or not the wireless device 14 is capable of receiving user data during a random access procedure 20. The radio network node 12 in turn transmits signaling 18D (e.g., S1-AP signaling) to a core network node 16 indicating whether or not the wireless device 14 is capable of receiving user data during a random access procedure 20. The core network node 16 stores information in the device's context indicating the device's capability or lack thereof. In this example, the wireless device's RRC connection thereafter goes inactive.

The radio network node 12 (or a different radio network node due to device mobility) may at some point later transmit a paging message 24 (or a wake-up signal) to the wireless device 14, in response to a need to transmit downlink user data to the wireless device 14. This triggers the wireless device 14 to execute the random access procedure 20. After the exchange of MSG1 and MSG2, the wireless device 14 transmits MSG3 as an RRC Connection Resume Request. The radio network node 12 (or the different radio network node) then transmits a context resume request 26 to the core network node 16 to retrieve the device's context. The core network node 16 in response transmits signaling 18B in the form of a context resume response that includes the device's context as information which indicates whether or not the wireless device 14 is capable of receiving user data during a random access procedure 20. Based on the signaling 18B in this example indicating that the wireless device 14 is so capable, the radio network node 12 (or the different radio network node) transmits user data to the wireless device 14 in or in conjunction with MSG4 of the random access procedure 20. The wireless device 14 may correspondingly receive the user data in or in conjunction with MSG4.

In these and other embodiments, with the wireless device 14 having signaling that it is capable of receiving user data during the random access procedure 20, the wireless device 14 may accordingly monitor for reception of that user data during the random access procedure 20. In one or more embodiments, though, the wireless device 14 may only do so if it receives signaling from the radio network node 12 (or the different radio network node) indicating that user data is indeed to be sent or is desirable to be sent to the wireless device 14 during the random access procedure 20. Such signaling may for instance be included in the random access response message (i.e., MSG2) of the random access procedure 20, or may be included in the paging message 24 received prior to the random access procedure 20. In either case, the wireless device's monitoring may involve monitoring for over which signaling radio bearer (SRB) MSG4 is received and/or checking a logical channel identity (LCID) of a medium access control (MAC) header of MSG4.

Also in these and other embodiments, the wireless device 14 may notably select a random access preamble for the random access procedure 20 (i.e., for MSG1) from among a set of possible random access preambles that is agnostic as to whether or not user data is to be received during the random access procedure 20 or whether or not the wireless device is capable of receiving user data during the random access procedure 20. In this case, then, the random access preambles selectable by the wireless device 14 are not artificially limited or constrained by intended or supported reception of user data during the random access procedure 20. Some embodiments thereby avoid affecting preamble selection and preamble resource availability by avoiding preamble partitioning, which may prove especially beneficial in situations where the physical random access channel is heavily impacted by further partitioning or resource extension.

Alternatively or additionally, some embodiments herein may be usable even, or specifically when, the wireless device 14 does not transmit any user data during the random access procedure 20. For example, some embodiments enable user data in MSG4 when there is no user data in MSG3, e.g., for a mobile-terminated scenario. In these cases, then, the wireless device 14 during the random access procedure 20 may transmit an RRC message (e.g., MSG3) that excludes any uplink user data.

Note that in some embodiments the wireless device 14 receives the user data on a dedicated radio resource during the random access procedure 20. In other embodiments, though, the wireless device 14 receives the user data on a common (i.e., shared) radio resource during the random access procedure 20.

User data as used herein is distinguished from control data which controls the transfer of user data. User data may for instance include data that is typically transmitted over the user plane on a data channel, instead of over the control plane on a control channel.

In view of the above modifications and variations, FIG. 3 depicts a method performed by a wireless device 14 in accordance with particular embodiments. The method includes transmitting signaling indicating whether or not the wireless device 14 is capable of receiving user data during a random access procedure (Block 3). The signaling may constitute signaling 18A (e.g., as or in an RRC message) to radio network node 12, or signaling 18C to core network node 16. Either way, the signaling in some embodiments indicates whether or not the wireless device 14 is capable of receiving user data over a user plane during the random access procedure 20. In one such embodiment, the signaling may indicate whether or not the wireless device 14 is capable of receiving user data over a user plane during a random access procedure by indicating whether or not the wireless device 14 supports early data for CIoT EPS user plane (UP) optimization.

In some embodiments, the method may also includes selecting a random access preamble for the random access procedure 20 from among a set of possible random access preambles that is agnostic as to whether or not the wireless device 14 is capable of receiving user data during the random access procedure 20 (Block 302). The method may then include transmitting the selected random access preamble during the random access procedure 20 (Block 304).

In some embodiments, the method may also include receiving signaling indicating user data is to be sent or is desirable to be sent to the wireless device 14 during a random access procedure 20 (Block 306). For example, the signaling may be received in MSG2 of the random access procedure 20 or in a paging message received prior to the random access procedure 20.

In some embodiment, the method also includes, during the random access procedure 20, transmitting an RRC message that excludes any uplink user data (Block 308). The RRC message may for instance be an RRC connection resume request message or an RRC connection request message. Regardless, these and other embodiments may enable the wireless device 14 to receive user data during the random access procedure 20 even when the wireless device 14 does not transmit user data during the random access procedure 20, e.g., for a mobile-terminated scenario.

In some embodiments, the method further comprises monitoring for reception of user data (e.g., on a dedicated radio resource) during the random access procedure 20 (Block 310). This monitoring may for instance be based on the wireless device 14 having indicated that the wireless device 14 is capable of receiving user data during the random access procedure 20. Alternatively or additionally, the monitoring may be based (more directly) on the wireless device 14 having received signaling indicating user data is to be sent or is desirable to be sent to the wireless device 14 during the random access procedure 20. In any event, the method as shown may also include receiving user data (e.g., on a dedicated radio resource) during the random access procedure 20 in accordance with said signaling (Block 320).

Figure 4:
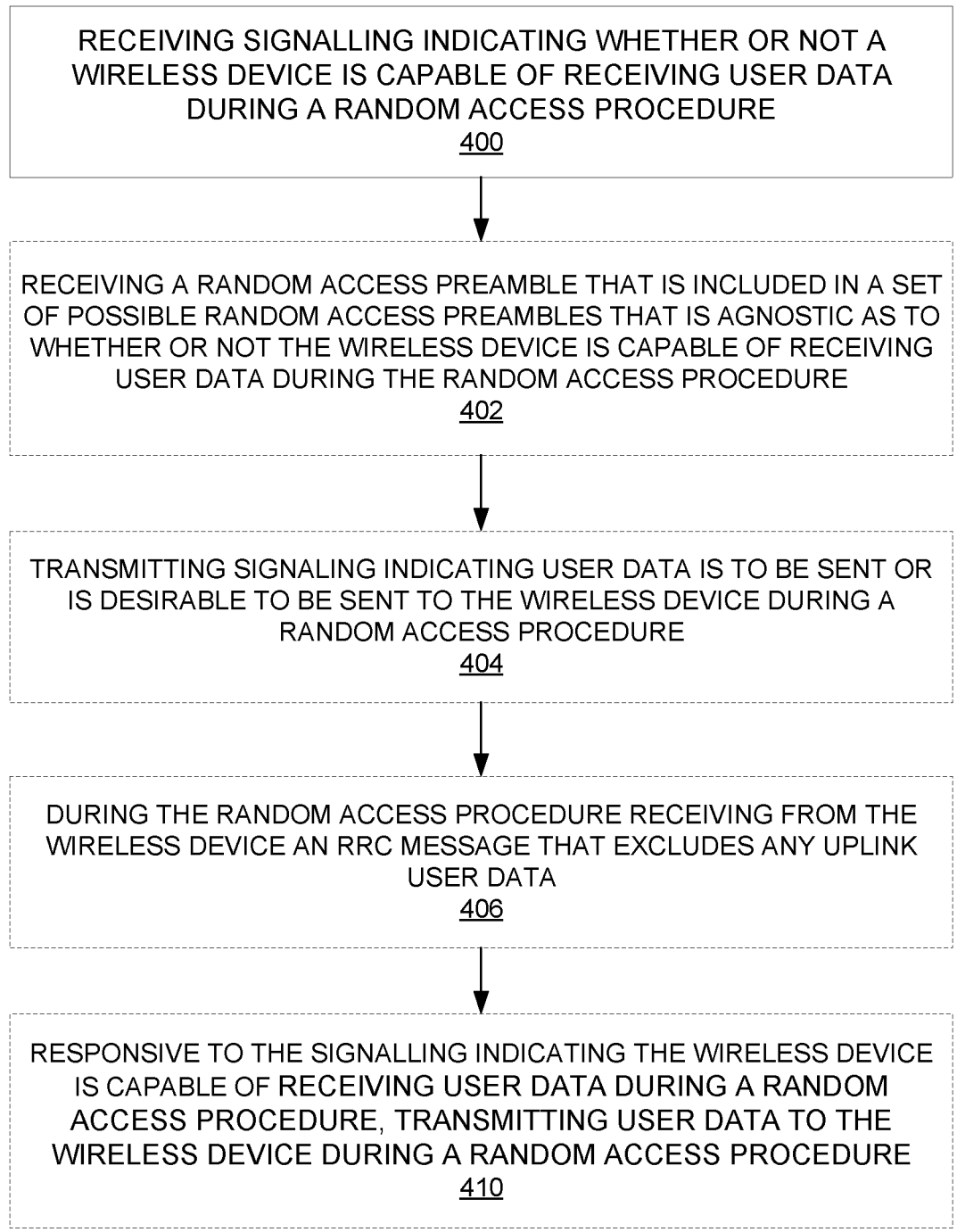
FIG. 4 is a logic flow diagram of a method performed by a network node according to some embodiments.

FIG. 4 depicts a method performed by a network node (e.g., radio network node 12 or core network node 16) in accordance with other particular embodiments. The method includes receiving signaling indicating whether or not a wireless device 14 is capable of receiving user data (e.g., on a dedicated radio resource) during a random access procedure 20 (Block 400). Where for instance the network node is radio network node 12, the signaling may constitute signaling 18A from the wireless device 14 or signaling 18B from the core network node 16 (e.g., as propagated from the wireless device 14). Alternatively, where the network node is core network node 16, the signaling may constitute signaling 18C from the wireless device 14.

In some embodiments as shown, the method may also include receiving a random access preamble for the random access procedure 20 from among a set of possible random access preambles that is agnostic as to whether or not the wireless device 14 is capable of receiving user data during the random access procedure 20 (Block 402). Alternatively or additionally, the method in some embodiments may include transmitting signaling indicating user data is to be sent or is desirable to be sent to the wireless device 14 during a random access procedure 20 (Block 404). For example, the signaling may be transmitted in MSG2 of the random access procedure 20 or in a paging message transmitted prior to the random access procedure 20.

In some embodiment, the method also includes, during the random access procedure 20, receiving an RRC message that excludes any uplink user data (Block 406). The RRC message may for instance be an RRC connection resume request message or an RRC connection request message. Regardless, these and other embodiments may enable the wireless device 14 to receive user data during the random access procedure 20 even when the wireless device 14 does not transmit user data during the random access procedure 20, e.g., for a mobile-terminated scenario.

In any event, the method in some embodiments (e.g., where the network node is radio network node 12) may also include, responsive to the signaling indicating the wireless device 14 is capable of receiving user data (e.g., on a dedicated radio resource) during a random access procedure 20, transmitting user data to the wireless device 14 (e.g., on a dedicated radio resource) during a random access procedure 20 (Block 410).

FIG. 5 depicts a method performed by core network node 16 in accordance with other particular embodiments. The method includes transmitting to a radio network node 12 signaling 18B indicating whether or not a wireless device 14 is capable of receiving user data (e.g., on a dedicated radio resource) during a random access procedure (Block 510). Alternatively or additionally, the method may include receiving from a wireless device 14 signaling 18A indicating whether or not the wireless device 14 is capable of receiving user data (e.g., on a dedicated radio resource) during a random access procedure (Block 500). In some embodiments, the method may also include storing, in a context for the wireless device 14 at the core network node 16, information indicating whether or not the wireless device 14 is capable of receiving user data during a random access procedure 20, in accordance with the received signaling (Block 505).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
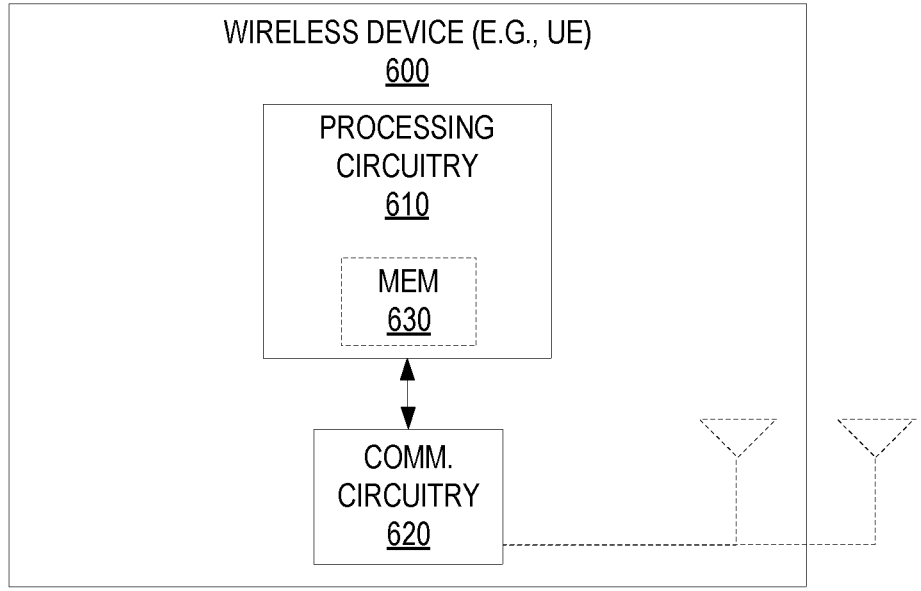
FIG. 6 is a block diagram of a wireless device according to some embodiments.

FIG. 6 for example illustrates a wireless device 600 (e.g., wireless device 14) as implemented in accordance with one or more embodiments. As shown, the wireless device 600 includes processing circuitry 610 and communication circuitry 620. The communication circuitry 620 (e.g., radio circuitry) is configured to transmit and/or receive information to and/or from one or more other nodes, e.g., via any communication technology. Such communication may occur via one or more antennas that are either internal or external to the wireless device 600. The processing circuitry 610 is configured to perform processing described above (e.g., in FIG. 3), such as by executing instructions stored in memory 630. The processing circuitry 610 in this regard may implement certain functional means, units, or modules.

Figure 7:
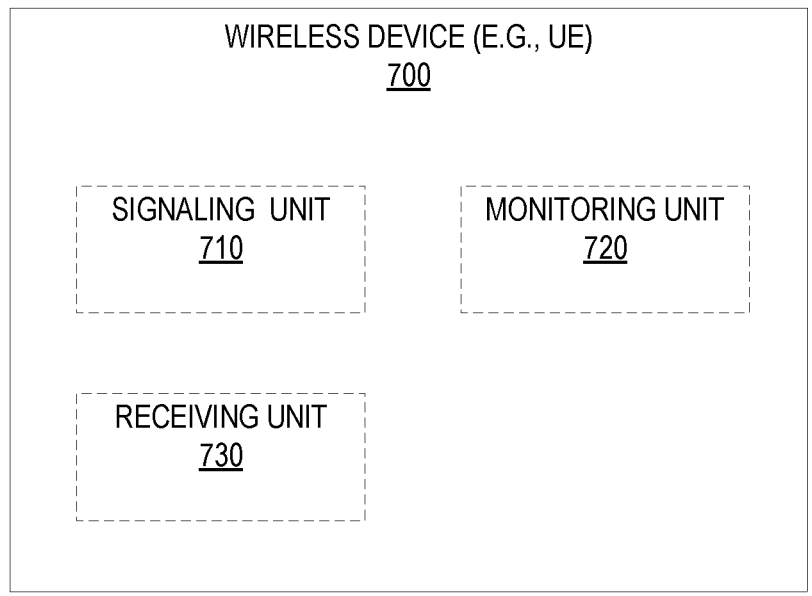
FIG. 7 is a block diagram of a wireless device according to other embodiments.
Figure 16:
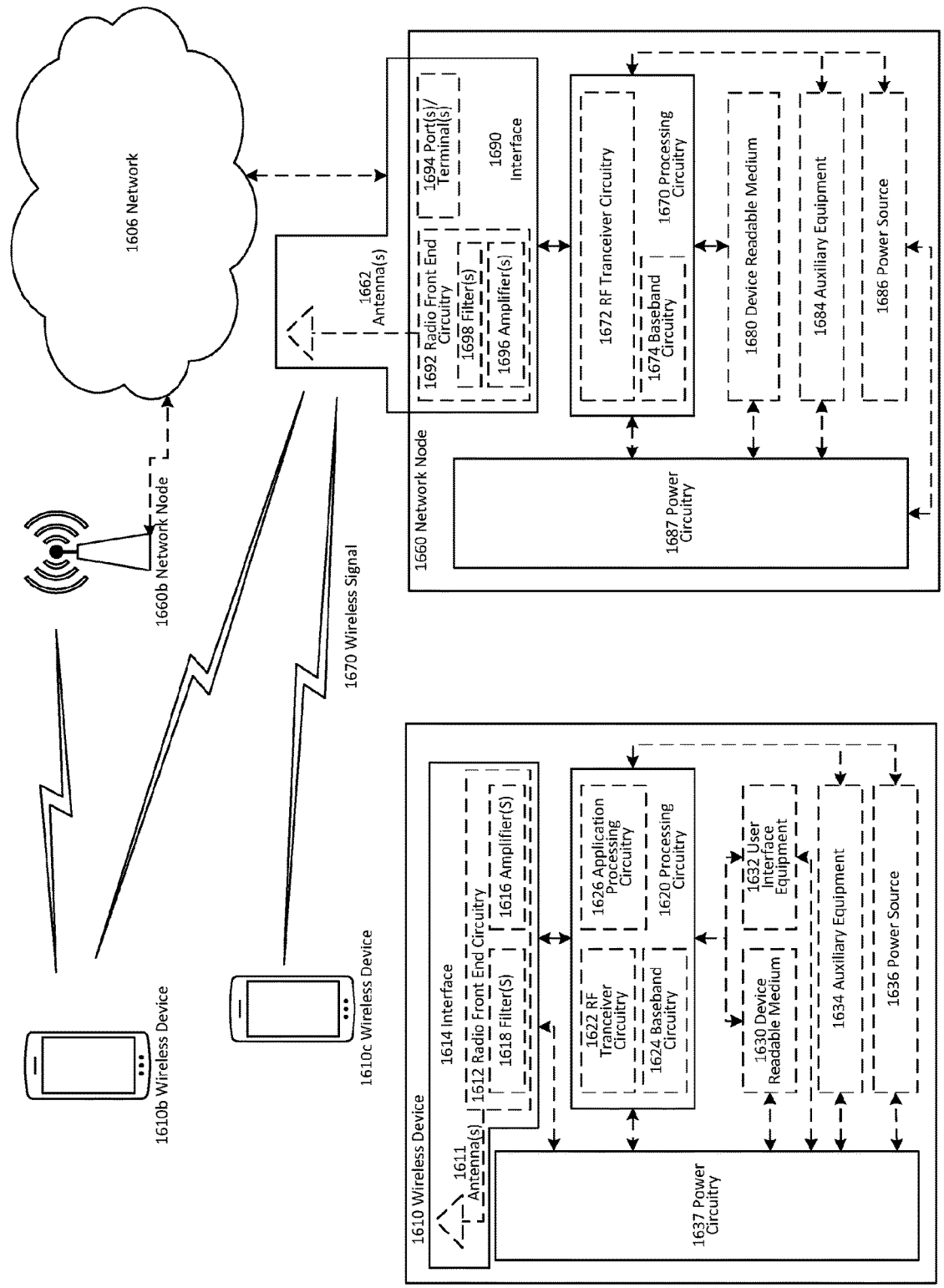
FIG. 16 is a block diagram of a user equipment according to some embodiments.

FIG. 7 illustrates a schematic block diagram of an wireless device 700 (e.g., wireless device 14) in a wireless network according to still other embodiments (for example, the wireless network shown in FIG. 16). As shown, the wireless device 700 implements various functional means, units, or modules, e.g., via the processing circuitry 610 in FIG. 6 and/or via software code. These functional means, units, or modules, e.g., for implementing the method(s) herein, include for instance: a signaling unit 710, a monitoring unit 720, and/or a receiving unit 730. The signaling unit 710 may be for transmitting signaling indicating whether or not the wireless device is capable of receiving user data (e.g., on a dedicated radio resource) during a random access procedure. The monitoring unit 720 may be for, based on indicating that the wireless device is capable of receiving user data (e.g., on a dedicated radio resource) during the random access procedure, monitoring for reception of user data (e.g., on a dedicated radio resource) during the random access procedure. The receiving unit 730 may be for receiving user data (e.g., on a dedicated radio resource) during the random access procedure in accordance with said signaling.

Figure 8:
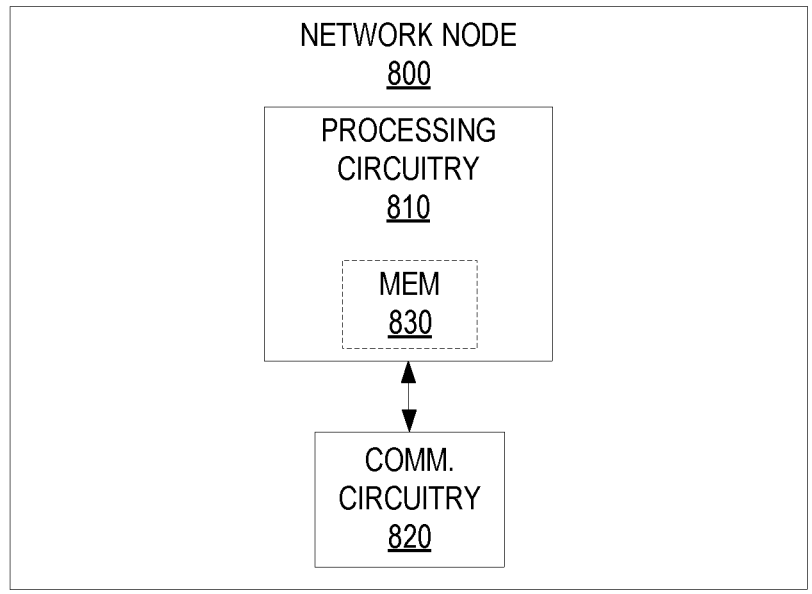
FIG. 8 is a block diagram of a network node according to some embodiments.

FIG. 8 illustrates a network node 800 (e.g., radio network node 12 or core network node 16) as implemented in accordance with one or more embodiments. As shown, the network node 800 includes processing circuitry 810 and communication circuitry 820. The communication circuitry 820 is configured to transmit and/or receive information to and/or from one or more other nodes, e.g., via any communication technology. The processing circuitry 810 is configured to perform processing described above (e.g., in FIG. 4 or 5), such as by executing instructions stored in memory 830. The processing circuitry 810 in this regard may implement certain functional means, units, or modules.

Figure 9:
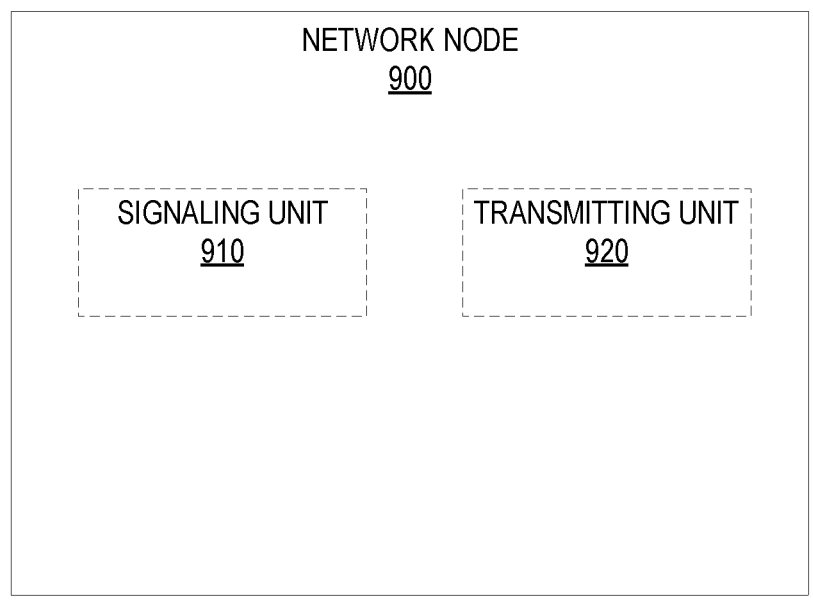
FIG. 9 is a block diagram of a network node according to other embodiments.

FIG. 9 illustrates a schematic block diagram of a network node 900 (e.g., radio network node 12 or core network node 16) in a wireless network according to still other embodiments (for example, the wireless network shown in FIG. 16). As shown, the network node 900 implements various functional means, units, or modules, e.g., via the processing circuitry 810 in FIG. 8 and/or via software code. These functional means, units, or modules, e.g., for implementing the method(s) herein, include for instance a signaling unit 910 and/or a transmitting unit 920. The signaling unit 910 may be for receiving signaling indicating whether or not a wireless device 14 is capable of receiving user data (e.g., on a dedicated radio resource) during a random access procedure 20. The transmitting unit 920 may be for, responsive to the signaling indicating the wireless device is capable of receiving user data (e.g., on a dedicated radio resource) during a random access procedure 20, transmitting user data to the wireless device 14 (e.g., on a dedicated radio resource) during a random access procedure 20.

Figure 10:
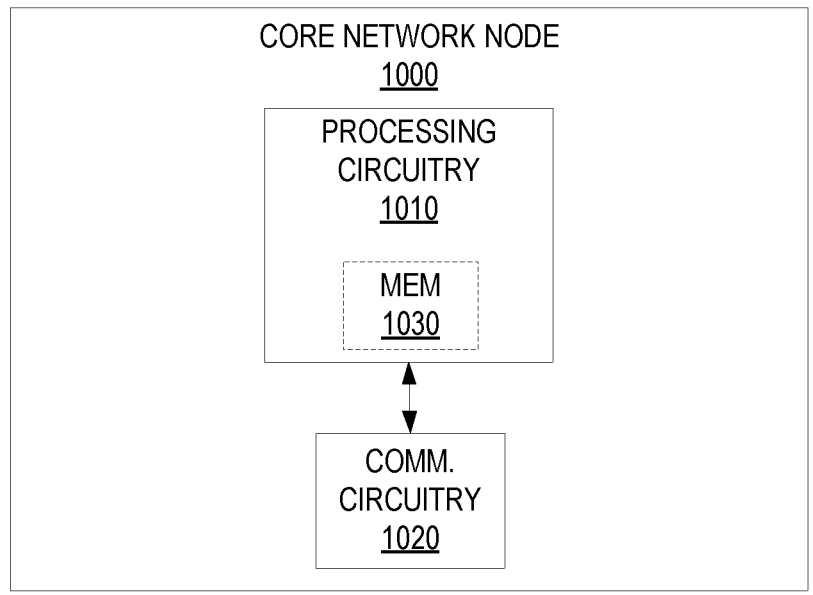
FIG. 10 is a block diagram of a core network node according to some embodiments.

FIG. 10 illustrates a core network node 1000 (e.g., core network node 16) as implemented in accordance with one or more embodiments. As shown, the core network node 1000 includes processing circuitry 1010 and communication circuitry 1020. The communication circuitry 1020 is configured to transmit and/or receive information to and/or from one or more other nodes, e.g., via any communication technology. The processing circuitry 1010 is configured to perform processing described above (e.g., in FIG. 4 and/or 5), such as by executing instructions stored in memory 1030. The processing circuitry 1010 in this regard may implement certain functional means, units, or modules.

Figure 11:
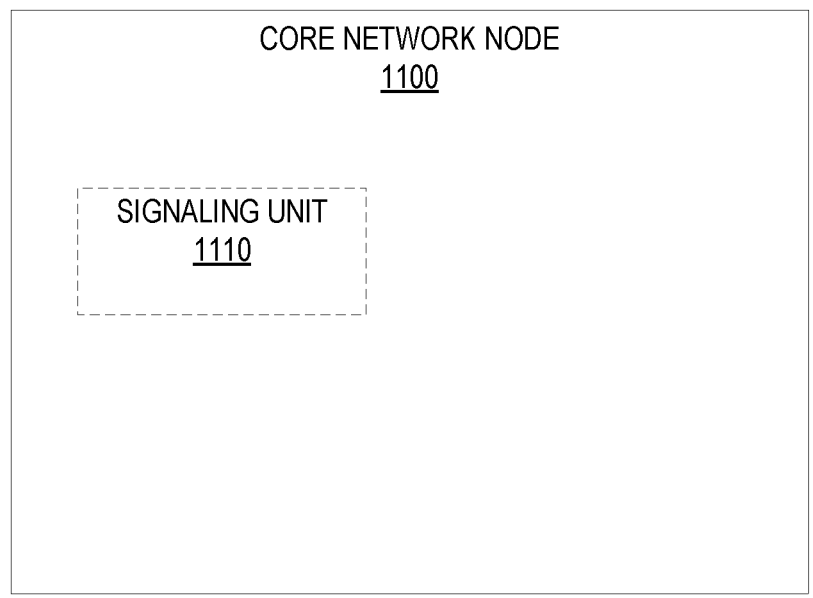
FIG. 11 is a block diagram of a core network node according to other embodiments.

FIG. 11 illustrates a schematic block diagram of a core network node 1100 (e.g., core network node 16) in a wireless network according to still other embodiments (for example, the wireless network shown in FIG. 16). As shown, the core network node 1100 implements various functional means, units, or modules, e.g., via the processing circuitry 1010 in FIG. 10 and/or via software code. These functional means, units, or modules, e.g., for implementing the method(s)

herein (e.g., in FIG. 4 and/or 5), include for instance a signaling unit 1110 for transmitting to a radio network node 16 signaling indicating whether or not a wireless device 14 is capable of receiving user data (e.g., on a dedicated radio resource) during a random access procedure 20. Alternatively or additionally, the signaling unit 1110 may be for receiving from a wireless device 14 signaling indicating whether or not the wireless device 14 is capable of receiving user data (e.g., on a dedicated radio resource) during a random access procedure 20.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

There has been a lot of work in 3GPP lately on specifying technologies to cover Machine-to-Machine (M2M) and/or Internet of Things (IoT) related use cases. Most recent work for 3GPP Release 13 and 14 includes enhancements to support Machine-Type Communications (MTC) with new user equipment (UE) categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

Long Term Evolution (LTE) enhancements introduced in 3GPP Release 13, 14, and 15 for MTC will be referred to as "eMTC", including (not limiting) support for bandwidth limited UEs, Cat-M1, and support for coverage enhancements. This is to separate discussions from NB-IoT (notation here used for any Release), although the supported features are similar on a general level.

For both eMTC and NB-IoT, 'CIoT EPS UP optimization' and 'CIoT EPS CP optimization' signaling reductions were also introduced in Rel-13. The former, here referred to as UP-solution, allows the UE to resume a previously stored RRC connection (thus also known as RRC Suspend/Resume). The latter, here referred to as CP-solution, allows the transmission of user-plane data over NAS (aka DoNAS).

For 3GPP Release 15, new work items (WIs) "Even further enhanced MTC for LTE (LTE_eMTC4)" [WI_eMTC] and "Further NB-IoT enhancements (NB_IO-Tenh2)" [WI_NBIOT] target eMTC and NB-IoT enhancements, respectively. In both of these WIs, a common goal is to reduce UE power consumption and latency through introducing possibilities to send data as early as possible during the Random Access (RA) procedure. From [WI_eMTC]: Support early data transmission; Evaluate power consumption/latency gain and specify necessary support for DL/UL data transmission on a dedicated resource during the RA procedure (after PRACH transmission and before the RRC connection setup is completed) at least in the RRC Suspend/Resume case. And from [WI_NBIOT]: Evaluate power consumption/latency gain and specify necessary support for DL/UL data transmission on a dedicated resource during the RA procedure after NPRACH transmission and before the RRC connection setup is completed.

Early DL data transmission in Msg4 is to be supported for both Rel-13 UP and CP solutions.

Figure 12:
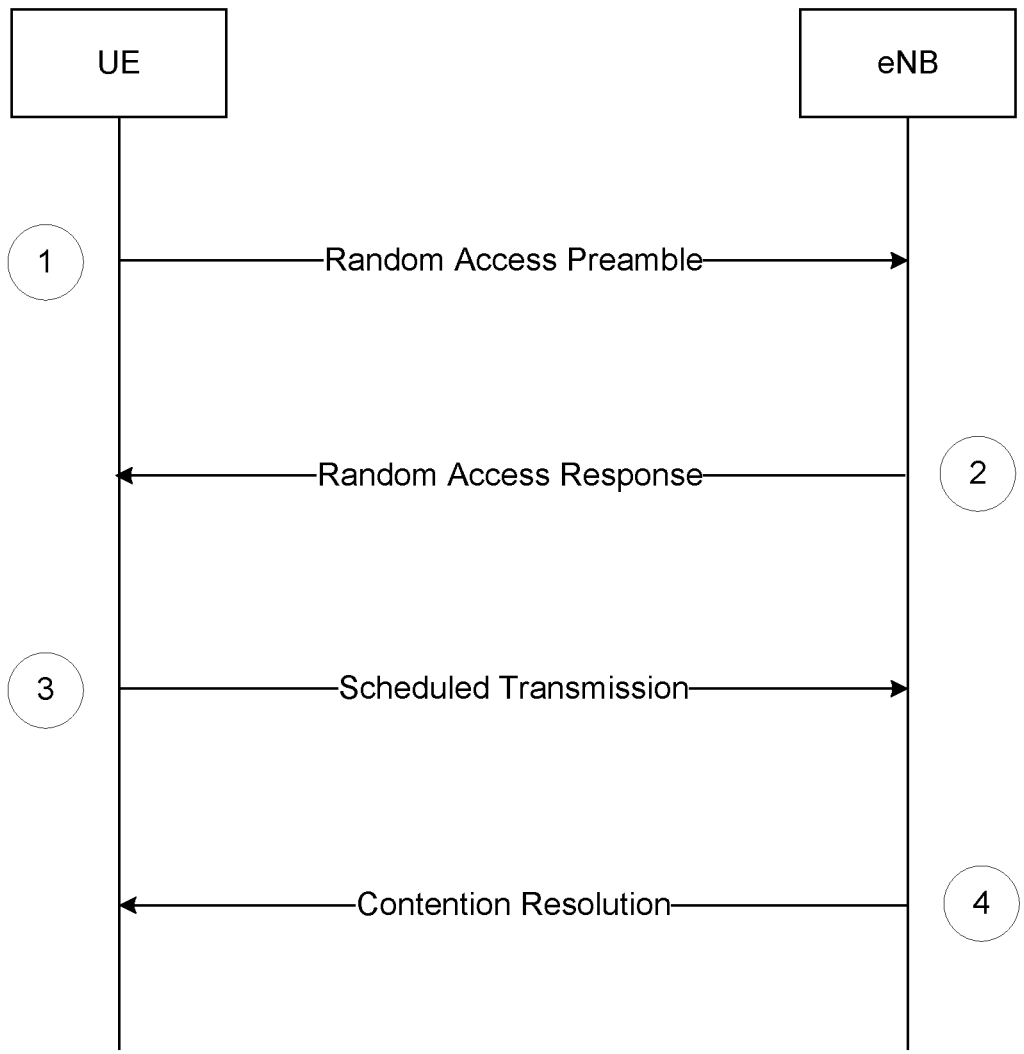
FIG. 12 is a block diagram of a random access procedure according to some embodiments.

To facilitate the description, the messages in the RA procedure are commonly referred to as message 1 (Msg1) through message 4 (Msg4). From TS36.300, the contention-based RA procedure is illustrated as in FIG. 12.

It is commonly agreed that EDT can be enabled for UL Msg3 only, or DL Msg4 only, or both Msg3 and Msg4 depending on actual use cases.

In some approaches for realizing the early data transmission concept, the UE can indicate its intention of using EDT by the way it selects the preamble in Msg1. However, this requires some sort of preamble partitioning and possibly extension of (N)PRACH resources, which has a negative impact on (N)PRACH performance. When there is only early DL data in Msg4, for example, the UE does not have UL data to send in Msg3, so it is desired to avoid such early indication in Msg1 and the partitioning issue. In addition, in the UP solution, one approach is to provide a large UL grant in Msg2 in addition to legacy UL grant to allow for the transmission of data in Msg3. However, when there is no UL data to transmit in Msg3, such provisioned resources are wasted.

Some embodiments herein propose a solution to improve the efficiency of EDT for DL Msg4 only, i.e., mobile terminated (MT) scenario for both UP and CP solutions. Some embodiments enable the EDT capable UE and the eNB to behave as in legacy operations regarding the preamble selection and the provision of UL grant in Msg2, therefore avoiding unnecessary additional complexity and unused resources in the case of early data in MT scenario. Embodiments are valid for LTE and NB-IoT, but will be valid also for 5G/NR.

Certain aspects of the present disclosure and their embodiments may provide solutions to these or other challenges. Some embodiments propose a solution to enable EDT in Msg4 when there is no EDT in Msg3, e.g. for MT scenario, in both the cases of CP and UP early data transmissions.

In some embodiments, the UE capability maintained and exchanged between UE, eNB, and mobility management entity (MME) is extended to include early data capability to facilitate EDT-related operations. CP and UP early data may be distinguished in the UE capability record, or it can be a common EDT capability. Existing S1-AP signaling procedures can be used for the eNB to retrieve UE EDT capability. Existing RRC signaling procedures can be used for the UE and eNB to enable or disable the EDT feature. In some embodiments, the UE reports the EDT capability to the MME upon initial Attach procedure to the network. The MME stores this EDT capability in the UE context in MME.

When an EDT capable UE triggers the Random access procedure as a response to the paging for receiving DL data, it does select a preamble in Msg1 as in legacy operation (i.e. not in any EDT soft/virtual/hard partition but is free to use any preamble available). Thus, the eNB could send a legacy Msg2 without any additional UL grant.

In some embodiments for CP-based early data, in Msg3 (incl. the RRCConnectionRequest), the UE includes a one-bit flag to indicate that it supports CP EDT and is able to decode a CP early data transmission in Msg4. Being aware of a CP EDT capable UE, either by receiving the RRCConnectionRequest with such a flag in Msg3, or by retrieving UE capability from MME, the eNB sends an early DL data in Msg4, i.e., multiplexing the RRCconnectionSetup with a RRC message carrying DL NAS-PDU on CCCH logical channel.

In some embodiments for UP-based early data, the UE performs relevant steps as if it is about to send early data in Msg3. The UE sends a legacy Msg3 including the RRCConnectionResumeRequest. (if dual grants are used for EDT, eNB cannot tell that the UE is EDT capable in this step if the smaller legacy grant is used for Msg3 transmission). The UE resumes radio bearers and prepare for the possible transmission of early data in Msg4. Being aware of a UP EDT capable UE by retrieving the information from MME, e.g., via the S1-AP UE Resume Context procedure, the eNB sends early DL data in Msg4, i.e., multiplexing DL data on DTCH and the RRCConnectionResume on DCCH logical channel.

When the UE decodes Msg4, it can from e.g. the MAC header and the LCID determine whether it is a legacy Msg4 transmission on SRB0 (signal radio bearer) or a EDT on Msg4 on SRB1.

Some embodiments thereby solve the problem of how to avoid the issue of preamble partitioning and extension and providing unused UL grant in CP and UP early data transmissions being considered for LTE, NB-IoT, and 5G/NR.

Certain embodiments may provide one or more of the following technical advantage(s). Some embodiments advantageously enable early data transmission in Msg4 when there has not been early data transmission in Msg3 (e.g. in the mobile terminated case). Further, some embodiments improve the CP and UP early data transmissions in MT scenario by avoiding the preamble partitioning in Msg2 as well as potentially unused and wasted large grant in Msg2 in UP case. This is very beneficial, especially in the situations where the (N)PRACH performance is heavily impacted by any further partitioning or resource extension. In addition, possible waste of resources due to the large UL grant allocated for early data in Msg3 can be avoided. Furthermore, some embodiments ensure backward compatibility.

In view of the embodiments above, the present disclosure generally includes the following embodiments, e.g., which may address one or more of the issues disclosed herein.

UE Capability

Figure 13:
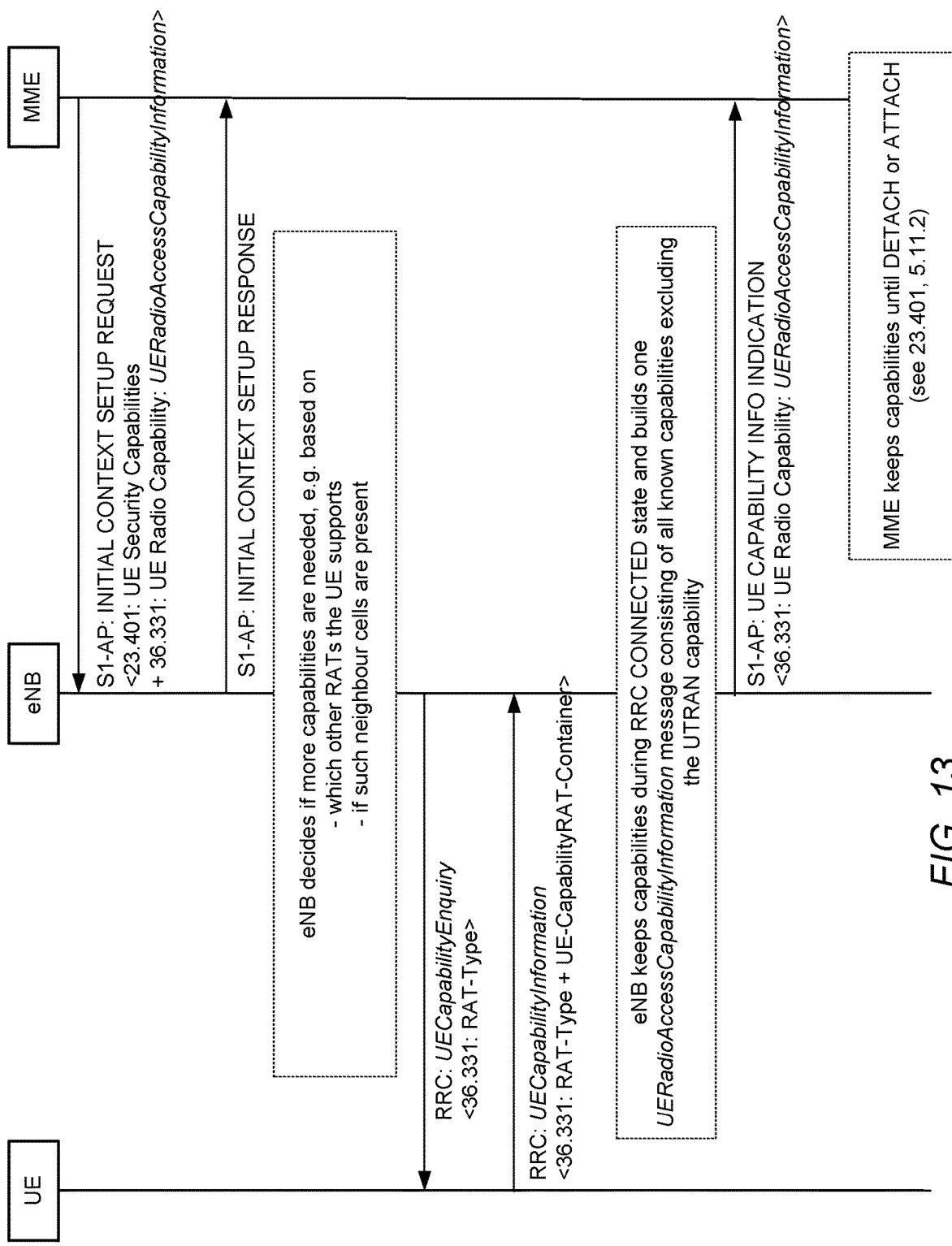
FIG. 13 is a call flow diagram of signaling for a wireless device to receive user data during a random access procedure according to other embodiments.

For both UP and CP early data transmissions, it is desirable for relevant network nodes to be aware of UE capability in terms of EDT support in order to facilitate EDT-related operations. One example of such is when the eNB wants to send early DL data to the UE in Msg4 without knowing whether it supports early data or not. Thus, the UE capability IE, related signaling messages, and procedures used to maintain and exchange UE capability (e.g. see FIG. 13), are extended in some embodiments to include the information about the EDT capability of UE.

In one embodiment, the UE capability IE, related signaling messages, and procedures being maintained and exchanged between UE, eNB and MME are extended to include EDT capability. This is useful in some embodiments for any EDT-related operations. This is also to facilitate the retrieval of EDT capability of UE in the S1-AP UE Context Resume procedure from the MME, so that the eNB is aware that the UE is ready to receive early data in Msg4

In some embodiments, there are separate UE capabilities for different methods of EDT, i.e., CP and UP solutions. Alternatively, the EDT capability is common such that a UE with this capability is or should be capable of both CP EDT and UP EDT.

Accordingly, in one embodiment, the UE capability in terms of EDT support specifies also which type of early data solution, i.e., UP or CP or both, it supports.

In one embodiment, the UE can enable or disable its EDT support by requesting an update to the eNB via, e.g., the RRC UE information transfer, UE capability transfer, or upon Tracking Area Update (TAU).

In one embodiment, the eNB can suggest the UE to enable or disable the EDT feature via RRC signaling procedures, e.g., existing UE capability transfer.

In some embodiments, the EDT UE capability is communicated to the network upon initial Attach procedure, and then stored in UE context in MME. MME is then able to provide the EDT UE capability to eNB over S1-AP signaling when needed. For example, in the case of EDT in Msg4 when there has been no EDT in Msg3, i.e. in the use case of mobile terminated traffic, to enable to possibility of EDT in Msg4.

UE Behavior Before Transmission of Msg3

If there is data pending for the UE in the serving gateway (sGW), MME will send a paging message/request to one or more eNBs to establish contact with the UE. The eNB then pages the UE. If the UE is EDT capable, and it does not have UL data to transmit in Msg3, or if it has but decides not to transmit UL data in Msg3, (e.g., too much UL data in buffer), it selects preamble as a legacy UE, e.g., as opposed to selecting an EDT type of preamble.

In one embodiment, an EDT capable UE selects preamble as a legacy UE in case the random access procedure is triggered by mobile-terminated events. In an alternative embodiment, the UE select over all possible preambles, both legacy and EDT preambles.

Having received a legacy Msg1, the eNB will send a legacy Msg2. Note that, in UP solution, Msg2 may be needed to be extended to include an additional grant for early data in Msg3. Thus, sending a normal Msg2 without additional UL grant in this case helps save unnecessary resources in MT scenario. (In an alternative embodiment for the dual-grant case, the UE could use the larger grant provided for Msg3, but since there is no data in the UE buffer it would just use padding for the remainder of the transport block, and this would then be used as indication of the UE's EDT capability).

It could then desirable for the UE to know if there would be early DL data in Msg4 for it. That is, to reduce the possible processing for decoding two different kinds of Msg4, legacy or with EDT.

In one embodiment, an EDT capable UE without data in Msg3 can be informed/signaled about the upcoming an early data Msg4. In some embodiments, this is signaled via an indication in Msg2 assuming that the eNB knows that it wants to send early data Msg4 to the UE. In some embodiments, for example, the reserved R-bits in Random Access Response (RAR) are used. Alternatively, in other embodiments, this is signaled by including an EDT flag in the UE's paging record in the paging message sent from the eNB to UE before the RA procedure. The eNB is then assumed to have had received another EDT indication in the S1-AP paging procedure from MME, i.e. the UE EDT capability is appended to the paging request from MME to Enb.

Actions Related to Transmission of Msg3 and Reception of Msg4

Note that in addition to the extension of UE capability, the UP and CP in some embodiments are identified by the content of Msg3. That is, if Msg3 includes the RRCConnectionRequest, the UE may support CP solution. Otherwise, if Msg3 includes the RRCConnectionResumeRequest, the UE may support UP solution.

There are some commonalities and differences between UP and CP solutions regarding the behavior of UE and eNB in actions related to Msg3 and Msg4.

At the time Msg3 is transmitted, the UE can be aware that it would receive an early data Msg4. However, the network does not know if the UE would be able to understand the Msg4 with early data or not, i.e. if the UE is EDT capable or not. Thus, the eNB in some embodiments is signaled to be made aware of whether the UE supports EDT and possibly what type of EDT it supports. This can be done via S1-AP signaling or RRC signaling procedures.

In one embodiment, the eNB knows whether and what type of EDT the UE supports before Msg4 by: (i) Either retrieval of UE capability from the MME using, e.g., S1-AP Retrieve UE Information procedure (for both CP and UP); (ii) Or during the S1-AP UE Context Resume procedure, the MME includes EDT capability of UE in the UE Context Resume Response message; (iii) Or the UE indicates in Msg3 its capability using a one-bit EDT flag. Note that only one bit is needed since if Msg3 includes the RRCConnectionRequest, the UE may support CP solution. Otherwise, if Msg3 includes the RRCConnectionResumeRequest, the UE may support UP solution.

Figure 14:
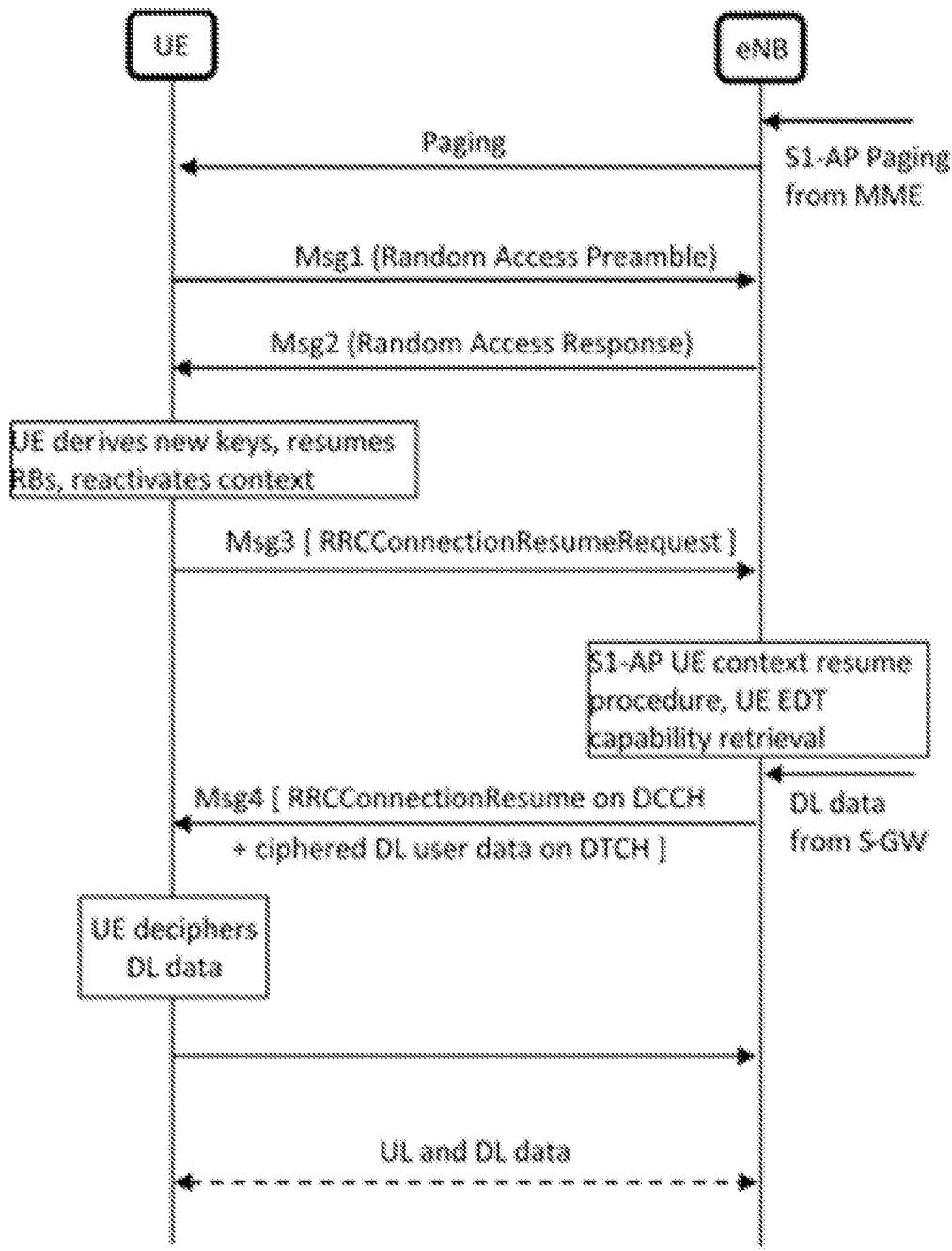
FIG. 14 is a block diagram illustrating user data as transferred during a random access procedure according to some embodiments.

A commonly preferred solution is DL data on DTCH is multiplexed with the RRCConnectionResume on DCCH. For security, DL data in Msg4 is expected to be sent ciphered, whereas the RRCConnectionResume is sent integrity protected in UP early data. Therefore, even though the UE does not send early data in Msg3, it needs to prepare steps for receiving an early data Msg4. The steps ensure that the security context is reactivated, security keys are derived, and radio bearers are resumed before Msg3 transmission (see also FIG. 14).

In one embodiment, the UE prepares itself, i.e., resuming context and bearers, deriving security keys, and restoring state of L2 entities, to receive early data in Msg4.

Then, the UE sends a legacy Msg3 (with RRCConnectionResumeRequest), i.e., excluding any UL data.

Figure 15:
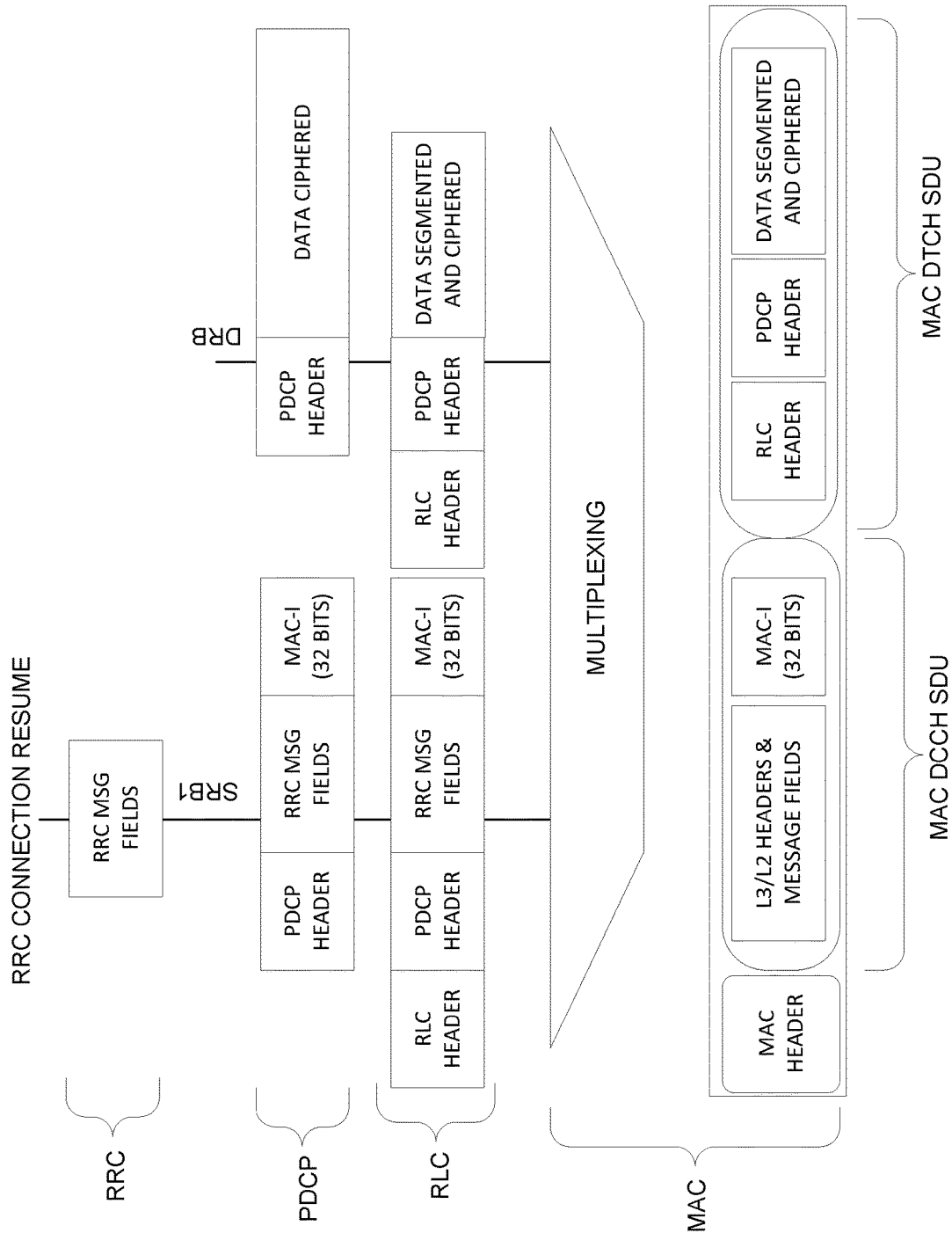
FIG. 15 is a block diagram of a wireless communication network according to some embodiments.

Once the eNB receives the Msg3, it can know if the UE supports CP or UP early data, as in an embodiment earlier and then decides to form and transmit Msg4 accordingly. FIG. 15 shows an example of content of Msg4 with early data in the UP solution.

In one embodiment, in a MT scenario, the eNB decides to send an early data Msg4 based on the type of Msg3 received and/or information about UE EDT capability retrieved from MME.

In particular, if the Msg3 includes the RRCConnectionRequest and the UE is CP early data capable, the eNB forms and sends Msg4 with NAS-PDU containing DL data. In this case, the NAS-PDU can be carried by the RRCConnectionSetup message or in a separate RRC message, e.g., the DLInformationTransfer. Otherwise, if the Msg3 includes the RRCConnectionResumeRequest and the UE is UP early data capable, the eNB forms and sends a Msg4 with data on DTCH multiplexed with the RRCConnectionResume on DCCH.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660b, and WDs 1610, 1610b, and 1610c. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (VVD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 17:
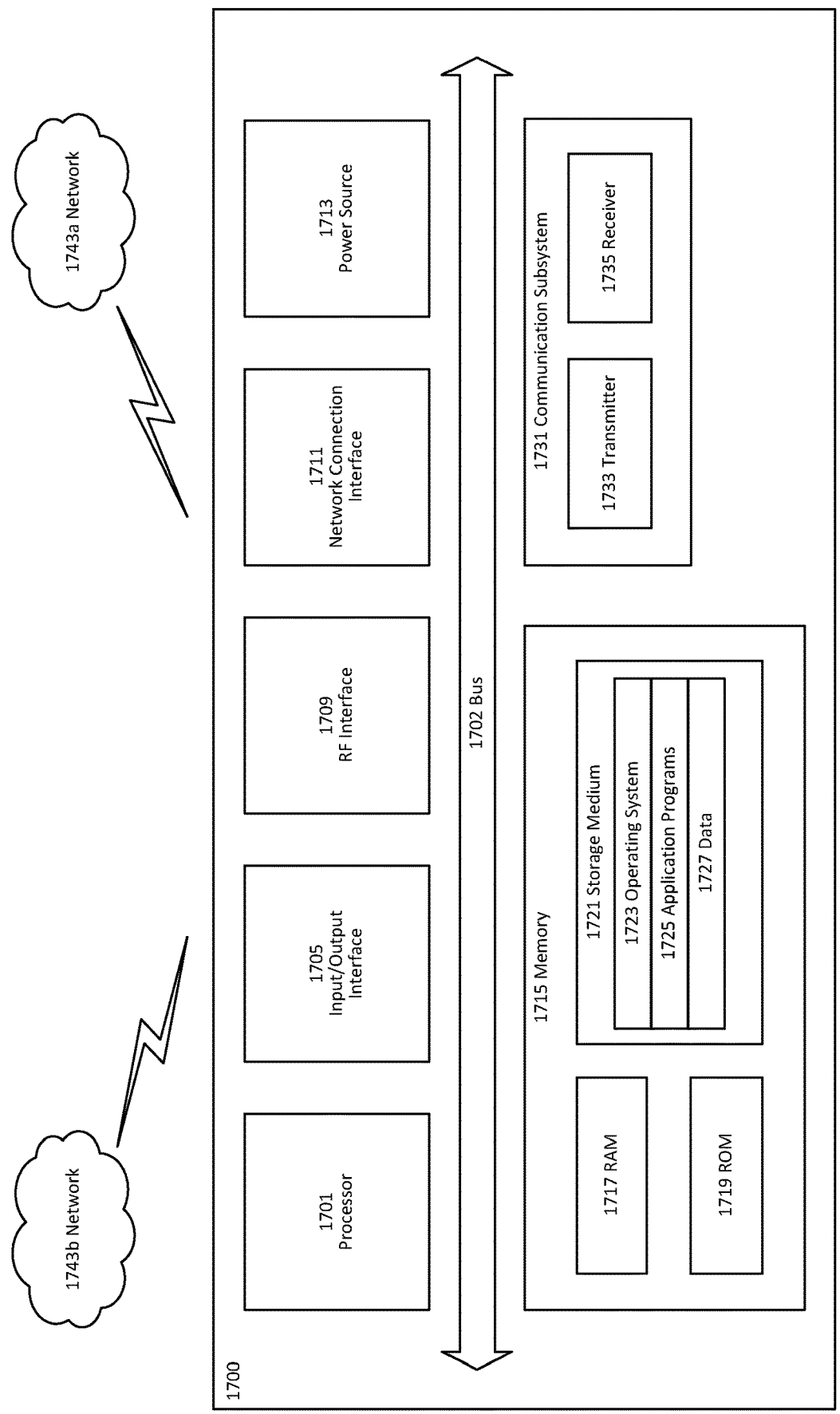
FIG. 17 is a block diagram of a virtualization environment according to some embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 17200 may be any UE identified by the $3^{rd}$ Generation Partnership Project (3GPP), including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1709 may be configured to provide a communication interface to RF components such as a transmitter, a receiver, and an antenna. Network connection interface 1711 may be configured to provide a communication interface to network 1743a. Network 1743a may encompass wired and/or wireless networks such as a local-area network (LAN), a wide-area network (WAN), a computer network, a wireless network, a telecommunications network, another like network or any combination thereof. For example, network 1743a may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 17, processing circuitry 1701 may be configured to communicate with network 1743b using communication subsystem 1731. Network 1743a and network 1743b may be the same network or networks or different network or networks. Communication subsystem 1731 may be configured to include one or more transceivers used to communicate with network 1743b. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.17, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743b may encompass wired and/or wireless networks such as a local-area network (LAN), a wide-area network (WAN), a computer network, a wireless network, a telecommunications network, another like network or any combination thereof. For example, network 1743b may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 18:
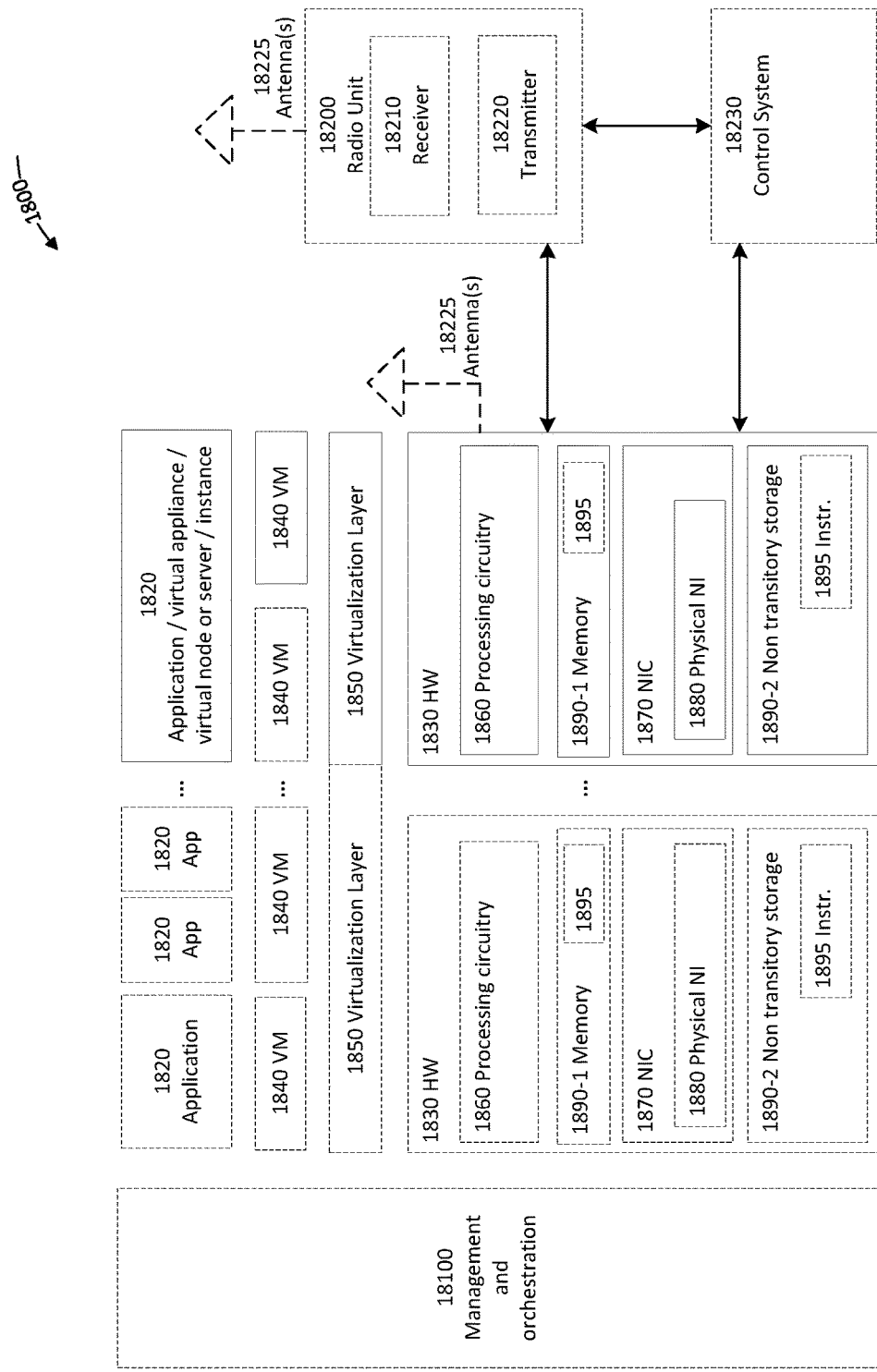
FIG. 18 is a block diagram of a communication network with a host computer according to some embodiments.

FIG. 18 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 18, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 may be coupled to one or more antennas 18225. Radio units 18200 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 18230 which may alternatively be used for communication between the hardware nodes 1830 and radio units 18200.

Figure 19:
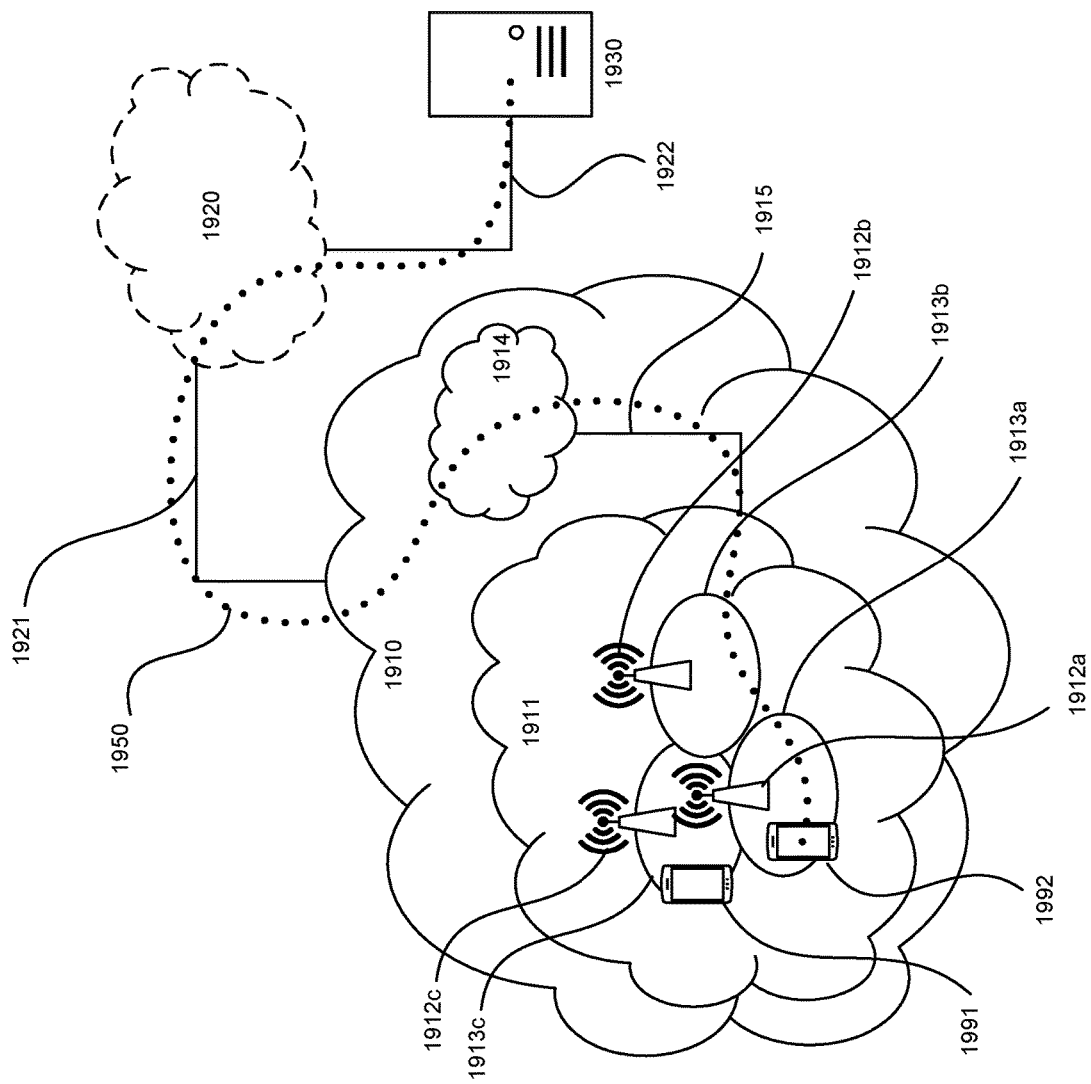
FIG. 19 is a block diagram of a host computer according to some embodiments.

FIG. 19 illustrates a telecommunication network connected via an intermediate network to a host computer in accordance with some embodiments. In particular, with reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991 located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 20:
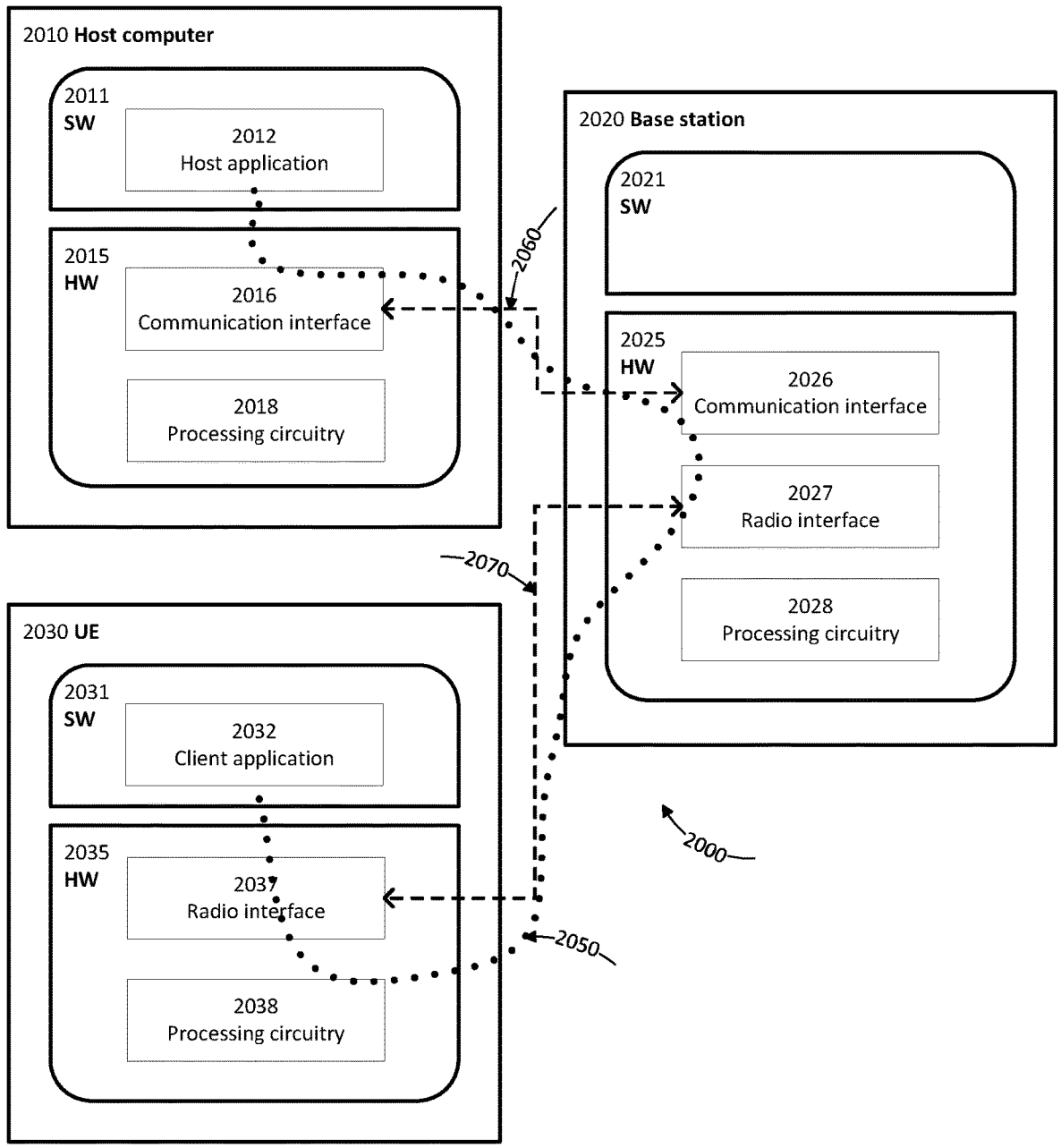
FIG. 20 is a flowchart illustrating a method implemented in a communication system, in accordance with one embodiment.

Example implementations, in accordance with an embodiment, of the UE, base station and host computer discussed in the preceding paragraphs will now be described with reference to FIG. 20. FIG. 20 illustrates host computer communicating via a base station with a user equipment over a partially wireless connection in accordance with some embodiments In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 may be configured to facilitate connection 2060 to host computer 2010. Connection 2060 may be direct or it may pass through a core network (not shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 20 may be similar or identical to host computer 1930, one of base stations 1912a, 1912b, 1912c and one of U Es 1991, 1992 of FIG. 19, respectively. This is to say, the inner workings of these entities may be as shown in FIG. 20 and independently, the surrounding network topology may be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve the latency required to send downlink data, reduce power consumption at the UE, and/or conserve radio resources and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 21:
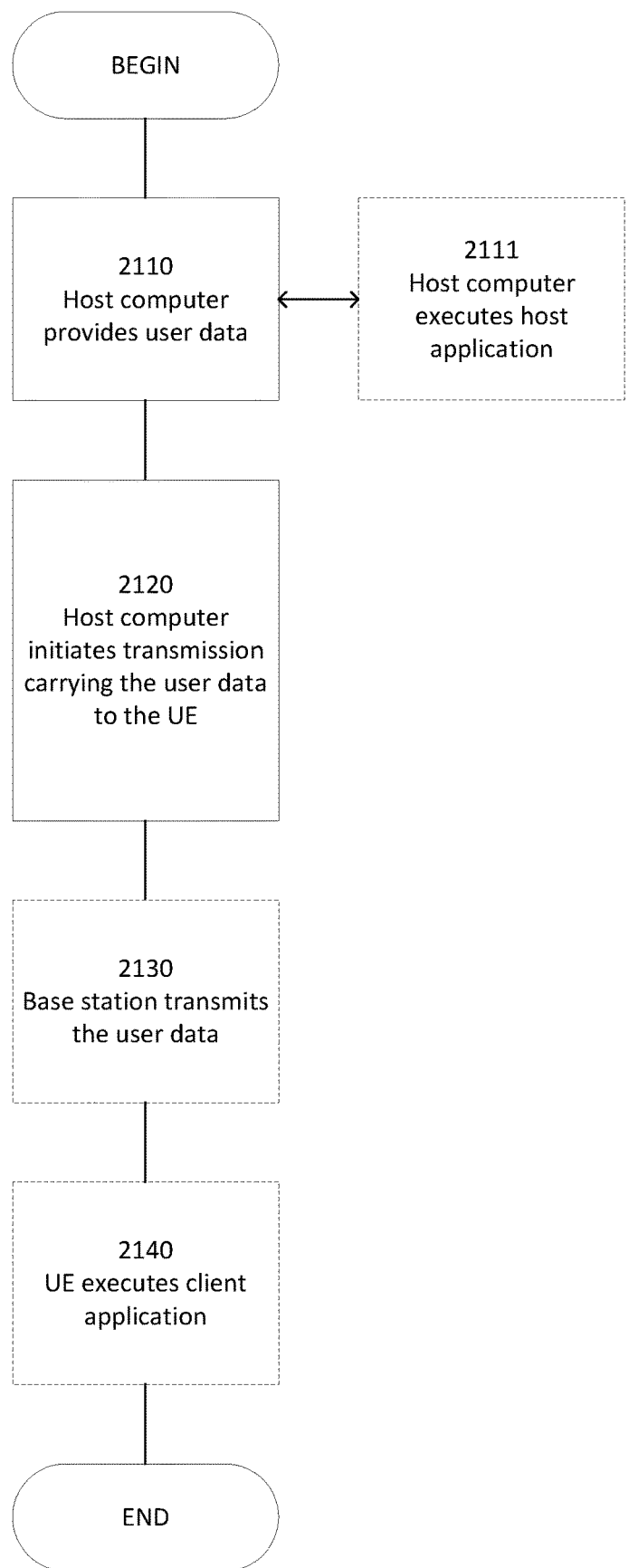
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 22:
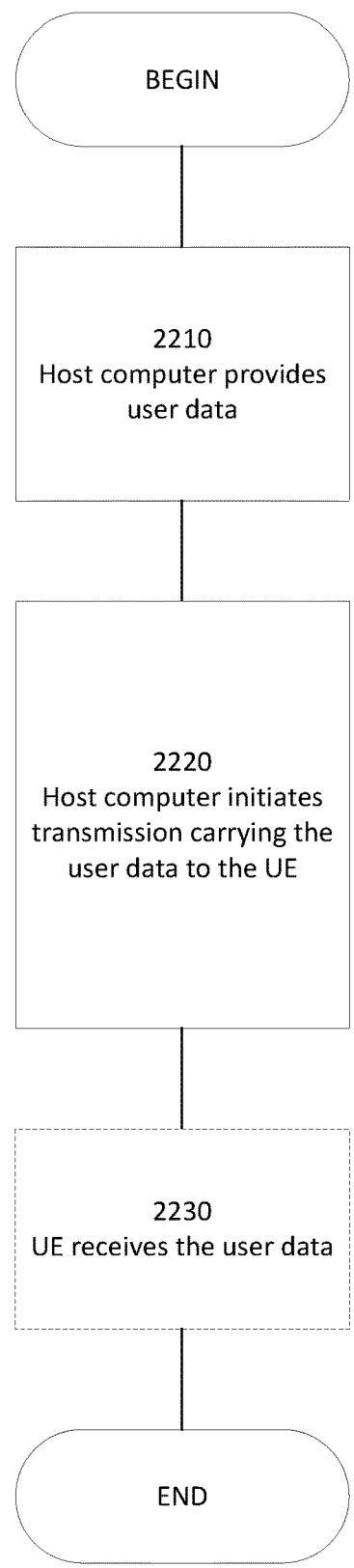
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 23:
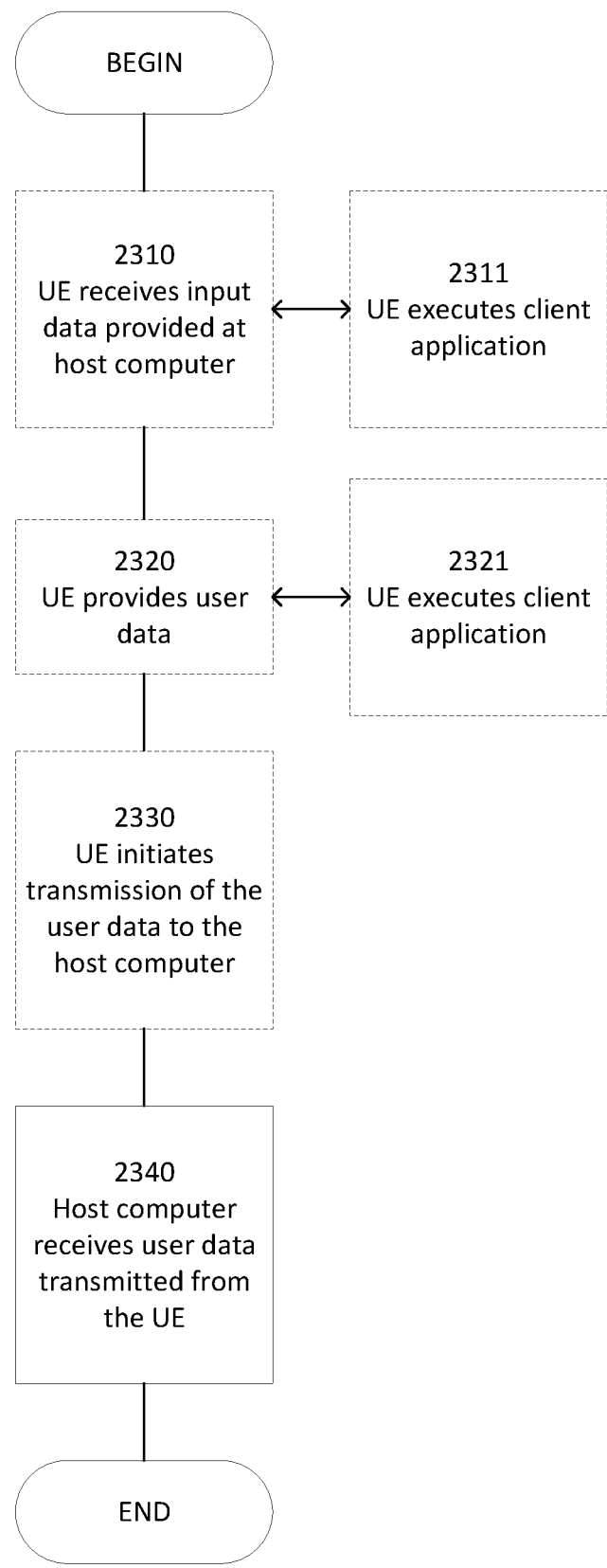
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 24:
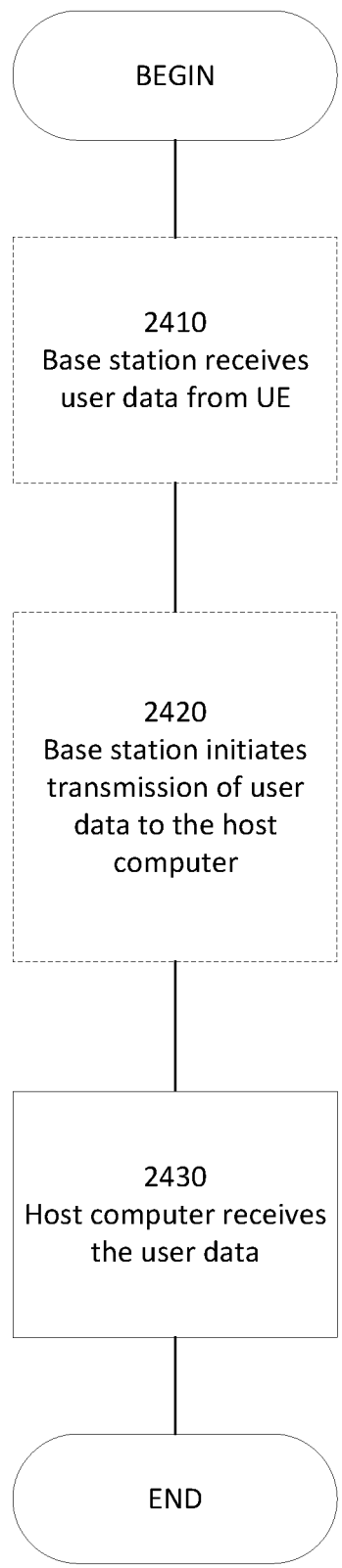
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Some embodiments herein may generally include those enumerated below.

Embodiment 1. A method performed by a wireless device configured for use in a wireless communication system, the method comprising: transmitting signalling indicating whether or not the wireless device is capable of receiving (user) data (on a dedicated radio resource) during a random access procedure.

Embodiment 2. The method of embodiment 1, further comprising, based on indicating that the wireless device is capable of receiving (user) data (on a dedicated radio resource) during the random access procedure, monitoring for reception of (user) data (on a dedicated radio resource) during the random access procedure.

Embodiment 3. The method of embodiment 2, wherein a radio resource control (RRC) message of the random access procedure is configurable to include (user) data transmitted to the wireless device (on a dedicated radio resource), wherein said monitoring comprises monitoring for over which signalling radio bearer the RRC message of the random access procedure is received.

Embodiment 4. The method of any of embodiments 2-3, wherein an RRC message of the random access procedure is configurable to include (user) data transmitted to the wireless device (on a dedicated radio resource), wherein said monitoring comprises checking a logical channel identity (LCID) of a medium access control (MAC) header of the RRC message of the random access procedure.

Embodiment 4A. The method of any of embodiments 3-4, wherein the RRC message is or is received with a contention resolution message.

Embodiment 5. The method of any of embodiments 1-4, further comprising receiving (user) data (on a dedicated radio resource) during the random access procedure in accordance with said signalling.

Embodiment 6. The method of any of embodiments 1-5, comprising transmitting the signalling to a base station in a radio resource control (RRC) message of the random access procedure.

Embodiment 7. The method of embodiment 6, wherein the RRC message is a RRC connection request message or an RRC connection resume request message.

Embodiment 8. The method of any of embodiments 6-7, wherein the signalling comprises a single-bit flag in the RRC message.

Embodiment 9. The method of any of embodiments 1-5, comprising transmitting the signalling to a core network node in a core network of the wireless communication system.

Embodiment 10. The method of embodiment 9, wherein the core network node is a mobility management entity (MME) or a node that implements a session management function (SMF).

Embodiment 11. The method of any of embodiments 9-11, comprising transmitting the signalling to the core network node during or upon an initial attach procedure for the wireless device to attach to the wireless communication system.

Embodiment 12. The method of any of embodiments 1-11, further comprising selecting a random access preamble for the random access procedure from among a set of possible random access preambles that is agnostic as to whether or not (user) data is to be received (on a dedicated radio resource) during the random access procedure, and transmitting the selected random access preamble during the random access procedure.

Embodiment 13. The method any of embodiments 1-12, further comprising receiving signalling indicating (user) data is to be sent or is desirable to be sent to the wireless device (on a dedicated radio resource) during a random access procedure.

Embodiment 14. The method of embodiment 13, wherein the signalling indicating (user) data is to be sent or is desirable to be sent to the wireless device is included in a random access response message from a base station to which the wireless device has transmitted a random access preamble.

Embodiment 15. The method of embodiment 13, wherein the signalling indicating (user) data is to be sent or is desirable to be sent to the wireless device is included in a paging message received prior to the random access procedure.

Embodiment 16. The method of any of embodiments 1-15, wherein during the random access procedure the wireless device transmits a radio resource control (RRC) message that excludes any uplink user data.

Embodiment 17. The method of any of embodiments 1-16, wherein the wireless device is a narrowband internet-of-thing (NB-IoT) device or an enhanced machine type communication (eMTC) device.

Embodiment 17A. The method of any of embodiments 1-17, wherein the signalling indicates whether or not the wireless device is capable of receiving (user) data (on a dedicated radio resource) over a control plane during a random access procedure and/or whether or not the wireless device is capable of receiving (user) data (on a dedicated radio resource) over a user plane during a random access procedure.

Embodiment AA. The method of any of the previous embodiments, further comprising: providing user data; and forwarding the user data to a host computer via the transmission to the base station.

Group B Embodiments

Embodiment 18. A method performed by a network node configured for use in a wireless communication system, the method comprising: receiving signalling indicating whether or not a wireless device is capable of receiving (user) data (on a dedicated radio resource) during a random access procedure.

Embodiment 19. The method of embodiment 18, further comprising, responsive to the signalling indicating the wireless device is capable of receiving (user) data (on a dedicated radio resource) during a random access procedure, transmitting (user) data to the wireless device (on a dedicated radio resource) during a random access procedure.

Embodiment 20. The method of embodiment 19, comprising transmitting the (user) data to the wireless device in a radio resource control (RRC) message of the random access procedure, wherein the RRC message is or is transmitted with a contention resolution message.

Embodiment 21. The method of any of embodiments 18-20, wherein the network node is a radio network node, and wherein said receiving comprises receiving the signalling from the wireless device in a radio resource control (RRC) message of the random access procedure.

Embodiment 22. The method of embodiment 21, wherein the RRC message is a RRC connection request message or an RRC connection resume request message.

Embodiment 23. The method of any of embodiments 21-22, wherein the signalling comprises a single-bit flag in the RRC message.

Embodiment 24. The method of any of embodiments 21-23, comprising receiving the signalling from the wireless device during or upon an initial attach procedure for the wireless device to attach to the wireless communication system.

Embodiment 25. The method of any of embodiments 18-20, wherein the network node is a radio network node, and wherein said receiving comprises receiving the signalling from a core network node in a core network of the wireless communication system.

Embodiment 26. The method of embodiment 25, wherein the core network node is a mobility management entity (MME) or a node that implements a session management function (SMF).

Embodiment 27. The method of any of embodiments 25-26, comprising receiving the signalling during a retrieve wireless device information procedure in which the radio network node retrieves information about the wireless device from the core network node or a wireless device context resume procedure performed by the radio network node with the core network node for resuming a context of the wireless device.

Embodiment 28. The method of any of embodiments 18-27, further comprising transmitting signalling indicating (user) data is to be sent or is desirable to be sent to the wireless device (on a dedicated radio resource) during a random access procedure.

Embodiment 29. The method of embodiment 28, wherein the signalling indicating (user) data is to be sent or is desirable to be sent to the wireless device is included in a random access response message.

Embodiment 30. The method of embodiment 28, wherein the signalling indicating (user) data is to be sent or is desirable to be sent to the wireless device is included in a paging message transmitted prior to the random access procedure.

Embodiment 31. The method of any of embodiments 18-30, further comprising during the random access procedure receiving from the wireless device a radio resource control (RRC) message that excludes any uplink user data.

Embodiment 32. The method of any of embodiments 18-31, wherein the wireless device is a narrowband internet-of-thing (NB-IoT) device or an enhanced machine type communication (eMTC) device.

Embodiment 32A. The method of any of embodiments 18-32, wherein the signalling indicates whether or not the wireless device is capable of receiving (user) data (on a dedicated radio resource) over a control plane during a random access procedure and/or whether or not the wireless device is capable of receiving (user) data (on a dedicated radio resource) over a user plane during a random access procedure.

Embodiment BB. The method of any of the previous embodiments, further comprising: obtaining user data; and forwarding the user data to a host computer or a wireless device.

Group X Embodiments

Embodiment 33. A method performed by a core network node configured for use in a wireless communication system, the method comprising: transmitting to a radio network node signalling indicating whether or not a wireless device is capable of receiving (user) data (on a dedicated radio resource) during a random access procedure.

Embodiment 34. The method of embodiment 33, wherein the core network node is a mobility management entity (MME) or a node that implements a session management function (SMF).

Embodiment 35. The method of any of embodiments 33-34, comprising transmitting the signalling during a retrieve wireless device information procedure in which the radio network node retrieves information about the wireless device from the core network node or a wireless device context resume procedure performed by the radio network node with the core network node for resuming a context of the wireless device.

Embodiment 36. The method of any of embodiments 33-35, wherein the wireless device is a narrowband internet-of-thing (NB-IoT) device or an enhanced machine type communication (eMTC) device.

Embodiment 37. The method of any of embodiments 33-36, wherein the signalling indicates whether or not the wireless device is capable of receiving (user) data (on a dedicated radio resource) over a control plane during a random access procedure and/or whether or not the wireless device is capable of receiving (user) data (on a dedicated radio resource) over a user plane during a random access procedure.

Group C Embodiments

Embodiment C1. A wireless device configured to perform any of the steps of any of the Group A embodiments.

Embodiment C2. A wireless device comprising: processing circuitry configured to perform any of the steps of any of the Group A embodiments; and power supply circuitry configured to supply power to the wireless device.

Embodiment C3. A wireless device comprising: processing circuitry and memory, the memory containing instructions executable by the processing circuitry whereby the wireless device is configured to perform any of the steps of any of the Group A embodiments.

Embodiment C4. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment C5. A computer program comprising instructions which, when executed by at least one processor of a wireless device, causes the wireless device to carry out the steps of any of the Group A embodiments.

Embodiment C6. A carrier containing the computer program of embodiment C5, wherein the carrier is one of an electronic signal, optical signal, radio signal, or computer readable storage medium.

Embodiment C7. A base station configured to perform any of the steps of any of the Group B embodiments.

Embodiment C8. A base station comprising: processing circuitry configured to perform any of the steps of any of the Group B embodiments; power supply circuitry configured to supply power to the base station.

Embodiment C9. A base station comprising: processing circuitry and memory, the memory containing instructions executable by the processing circuitry whereby the base station is configured to perform any of the steps of any of the Group B embodiments.

Embodiment C10. A computer program comprising instructions which, when executed by at least one processor of a base station, causes the base station to carry out the steps of any of the Group B embodiments.

Embodiment C11. A carrier containing the computer program of embodiment C10, wherein the carrier is one of an electronic signal, optical signal, radio signal, or computer readable storage medium.

Embodiment C12. A core network node configured to perform any of the steps of any of the Group X embodiments.

Embodiment C13. A core network node comprising: processing circuitry configured to perform any of the steps of any of the Group X embodiments; power supply circuitry configured to supply power to the core network node.

Embodiment C14. A core network node comprising: processing circuitry and memory, the memory containing instructions executable by the processing circuitry whereby the core network node is configured to perform any of the steps of any of the Group X embodiments.

Embodiment C15. A computer program comprising instructions which, when executed by at least one processor of a core network node, causes the core network node to carry out the steps of any of the Group X embodiments.

Embodiment C16. A carrier containing the computer program of embodiment C15, wherein the carrier is one of an electronic signal, optical signal, radio signal, or computer readable storage medium.

What is claimed is:

1. A core network node configured for use in a wireless communication system, the core network node comprising:
power supply circuitry configured to supply power to the core network node; and
processing circuitry configured to:
receive signaling indicating that a wireless device is capable of receiving user data during a random access procedure; and
store, in a context for the wireless device at the core network node, information indicating that the wireless device is capable of receiving user data during a random access procedure, in accordance with the received signaling; and
transmit, to a radio network node, signaling indicating that the wireless device is capable of receiving user data during a random access procedure, in accordance with the stored information.

2. The core network node of claim 1, wherein the transmitted signaling indicates that the wireless device is capable of receiving user data over a user plane during a random access procedure by indicating that the wireless device supports early data for cellular internet of things, CIoT, Evolved Packet System, EPS, user plane, UP, optimization.

3. The core network node of claim 2, wherein, according to early data for CIoT EPS UP optimization, a Radio Resource Control (RRC) connection resume message of the random access procedure is multiplexed with downlink user data on a dedicated traffic channel.

4. The core network node of claim 1, wherein the received signaling is received during or upon an initial attach procedure for the wireless device to attach to the wireless communication system.

5. The core network node of claim 1, wherein the wireless device is a narrowband internet-of-thing, NB-IoT, device or an enhanced machine type communication, eMTC, device.

6. The core network node of claim 1, wherein the received signaling and the transmitted signaling each indicate that the wireless device is capable of receiving user data over a user plane during a random access procedure.

7. A method performed by a core network node configured for use in a wireless communication system, the method comprising:
- receiving signaling indicating that a wireless device is capable of receiving user data during a random access procedure; and
- storing, in a context for the wireless device at the core network node, information indicating that the wireless device is capable of receiving user data during a random access procedure, in accordance with the received signaling; and
- transmitting, to a radio network node, signaling indicating that the wireless device is capable of receiving user data during a random access procedure, in accordance with the stored information.

8. The method of claim 7, wherein the transmitted signaling indicates that the wireless device is capable of receiving user data over a user plane during a random access procedure by indicating that the wireless device supports early data for cellular internet of things, CIoT, Evolved Packet System, EPS, user plane, UP, optimization.

9. The method of claim 8, wherein, according to early data for CIoT EPS UP optimization, a Radio Resource Control (RRC) connection resume message of the random access procedure is multiplexed with downlink user data on a dedicated traffic channel.

10. The method of claim 7, wherein the received signaling is received during or upon an initial attach procedure for the wireless device to attach to the wireless communication system.

11. The method of claim 7, wherein the wireless device is a narrowband internet-of-thing, NB-IoT, device or an enhanced machine type communication, eMTC, device.

12. The method of claim 7, wherein the received signaling and the transmitted signaling each indicate that the wireless device is capable of receiving user data over a user plane during a random access procedure.

13. A non-transitory computer-readable storage medium on which is stored instructions that, when executed by a processor of a core network node configured for use in a wireless communication system, cause the core network node to:
- receive signaling indicating that a wireless device is capable of receiving user data during a random access procedure; and
- store, in a context for the wireless device at the core network node, information indicating that the wireless device is capable of receiving user data during a random access procedure, in accordance with the received signaling; and
- transmit, to a radio network node, signaling indicating that the wireless device is capable of receiving user data during a random access procedure, in accordance with the stored information.

14. The non-transitory computer-readable storage medium of claim 13, wherein the transmitted signaling indicates that the wireless device is capable of receiving user data over a user plane during a random access procedure by indicating that the wireless device supports early data for cellular internet of things, CIoT, Evolved Packet System, EPS, user plane, UP, optimization.

15. The non-transitory computer-readable storage medium of claim 14, wherein, according to early data for CIoT EPS UP optimization, a Radio Resource Control (RRC) connection resume message of the random access procedure is multiplexed with downlink user data on a dedicated traffic channel.

16. The non-transitory computer-readable storage medium of claim 13, wherein the received signaling is received during or upon an initial attach procedure for the wireless device to attach to the wireless communication system.

17. The non-transitory computer-readable storage medium of claim 13, wherein the wireless device is a narrowband internet-of-thing, NB-IoT, device or an enhanced machine type communication, eMTC, device.

18. The non-transitory computer-readable storage medium of claim 13, wherein the received signaling and the transmitted signaling each indicate that the wireless device is capable of receiving user data over a user plane during a random access procedure.

* * * * *

UNITED STATES PATENT AND TRADEMARK OFFICE
CERTIFICATE OF CORRECTION

PATENT NO. : 11,382,137 B2
APPLICATION NO. : 16/755417
DATED : July 5, 2022
INVENTOR(S) : Höglund et al.

It is certified that error appears in the above-identified patent and that said Letters Patent is hereby corrected as shown below:

On the Title Page

In Item (57), under "ABSTRACT", in Column 2, Line 3, delete "(18A, 18C) 5 indicating" and insert -- (18A, 18C) indicating --, therefor.

In Item (57), under "ABSTRACT", in Column 2, Line 10, delete "Evolved 10 Packet" and insert -- Evolved Packet --, therefor.

On Page 2, in Item (56), under "OTHER PUBLICATIONS", in Column 2, Line 8, delete "Resouice" and insert -- Resource --, therefor.

On Page 2, in Item (56), under "OTHER PUBLICATIONS", in Column 2, Line 20, delete ""LTE:"" and insert -- "LTE; --, therefor.

On Page 2, in Item (56), under "OTHER PUBLICATIONS", in Column 2, Line 27, delete "feNB-IoT"," and insert -- FeNB-IoT", --, therefor.

On Page 2, in Item (56), under "OTHER PUBLICATIONS", in Column 2, Line 31, delete "WG2 #99bis," and insert -- WG2 Meeting #99bis, --, therefor.

In the Drawings

In Fig. 16, Sheet 13 of 21, for Tag "1672", Line 1, delete "Tranceiver" and insert -- Transceiver --, therefor.

In Fig. 16, Sheet 13 of 21, for Tag "1674", Lines 1-2, delete "Baseband Circuitry" and insert -- Baseband Processing Circuitry --, therefor.

In Fig. 16, Sheet 13 of 21, delete "1670 Wireless Signal".

Signed and Sealed this
Sixteenth Day of April, 2024

Katherine Kelly Vidal
*Director of the United States Patent and Trademark Office*

In Fig. 16, Sheet 13 of 21, for Tag "1616", Line 1, delete "Amplifier(S)" and insert -- Amplifier(s) --, therefor.

In Fig. 16, Sheet 13 of 21, for Tag "1618", Line 1, delete "Filter(S)" and insert -- Filter(s) --, therefor.

In Fig. 16, Sheet 13 of 21, for Tag "1622", Line 2, delete "Tranceiver" and insert -- Transceiver --, therefor.

In Fig. 16, Sheet 13 of 21, for Tag "1624", Lines 1-2, delete "Baseband Circuitry" and insert -- Baseband Processing Circuitry --, therefor.

In Fig. 17, Sheet 14 of 21, for Tag "1701", Line 1, delete "Processor" and insert -- Processing Circuitry --, therefor.

In Fig. 18, Sheet 15 of 21, for Tag "1890-2", Line 1, delete "Non transitory storage" and insert -- Non-transitory storage media --, therefor.

In Fig. 18, Sheet 15 of 21, for Tag "1890-2", Line 1, delete "Non transitory storage" and insert -- Non-transitory storage media --, therefor.

In the Specification

In Column 1, Line 45, delete "due wireless" and insert -- due to wireless --, therefor.

In Column 5, Line 50, delete "wireless device 12" and insert -- wireless device 14 --, therefor.

In Column 5, Line 52, delete "(narrowband) random access channel, (N)PRACH." and insert -- "(narrowband) physical random access channel, (N)PRACH. --, therefor.

In Column 5, Line 58, delete "wireless device 12." and insert -- wireless device 14. --, therefor.

In Column 6, Line 46, delete "CioT" and insert -- CIoT --, therefor.

In Column 6, Lines 59-60, delete "wireless device 14b" and insert -- wireless device 14 --, therefor.

In Column 7, Line 12, delete "due wireless" and insert -- due to wireless --, therefor.

In Column 8, Line 14, delete "such as an in" and insert -- such as in --, therefor.

In Column 9, Line 45, delete "(Block 3)." and insert -- (Block 300). --, therefor.

In Column 9, Line 57, delete "includes" and insert -- include --, therefor.

In Column 10, Line 5, delete "some embodiment," and insert -- some embodiments, --, therefor.

In Column 10, Line 55, delete "some embodiment," and insert -- some embodiments, --, therefor.

CERTIFICATE OF CORRECTION (continued)
U.S. Pat. No. 11,382,137 B2

In Column 11, Line 32, delete "microprocessor" and insert -- microprocessors --, therefor.

In Column 11, Line 62, delete "of an" and insert -- of a --, therefor.

In Column 13, Line 65, delete "(Wls)" and insert -- (WIs) --, therefor.

In Column 13, Line 67, delete "[Wl_eMTC]" and insert -- [WI_eMTC] --, therefor.

In Columns 13 & 14, Lines 67 & 1, delete "(NB_IOTenh2)"" and insert -- (NB_IoTenh2)" --, therefor.

In Column 14, Line 1, delete "[WI_NBIOT]" and insert -- [WI_NB-IoT] --, therefor.

In Column 14, Line 2, delete "Wls," and insert -- WIs, --, therefor.

In Column 14, Line 6, delete "[Wl_eMTC]:" and insert -- [WI_eMTC]: --, therefor.

In Column 14, Line 11, delete "[WI_NBIOT]:" and insert -- [WI_NB-IoT]: --, therefor.

In Column 14, Line 21, delete "TS36.300," and insert -- TS 36.300, --, therefor.

In Column 15, Line 15, delete "RRCconnectionSetup" and insert -- RRCConnectionSetup --, therefor.

In Column 15, Line 21, delete "(if dual" and insert -- (If dual --, therefor.

In Column 15, Line 33, delete "SRBO" and insert -- SRB0 --, therefor.

In Column 16, Line 8, delete "Msg4" and insert -- Msg4. --, therefor.

In Column 16, Line 57, delete "then desirable" and insert -- then be desirable --, therefor.

In Column 19, Line 58, delete "NodeB's." and insert -- NodeBs. --, therefor.

In Column 19, Line 59, delete "considered a" and insert -- considered as a --, therefor.

In Column 20, Line 32, delete "(SOC)." and insert -- (SoC). --, therefor.

In Column 20, Line 42, delete "units" and insert -- units. --, therefor.

In Column 21, Line 46, delete "considered a" and insert -- considered as a --, therefor.

In Column 21, Lines 55-56, delete "radio front end circuitry 1690" and insert -- radio front end circuitry 1692 --, therefor.

In Column 22, Line 28, delete "electricity outlet)" and insert -- electrical outlet) --, therefor.

In Column 22, Line 33, delete "integrated in," and insert -- integrated into, --, therefor.

In Column 22, Line 48, delete "(VVD)" and insert -- (WD) --, therefor.

In Column 22, Line 65, delete "a wireless cameras," and insert -- a wireless camera, --, therefor.

In Column 23, Line 4, delete "(CPE)." and insert -- (CPE), --, therefor.

In Column 23, Line 18, delete "narrow band" and insert -- narrowband --, therefor.

In Column 23, Line 55, delete "considered an" and insert -- considered as an --, therefor.

In Column 23, Line 59, delete "Radio front end circuitry 1614" and insert -- Radio front end circuitry 1612 --, therefor.

In Column 24, Line 1, delete "considered a" and insert -- considered as a --, therefor.

In Column 24, Line 35, delete "SOC." and insert -- SoC. --, therefor.

In Column 25, Line 51, delete "proximity or" and insert -- proximity sensor or --, therefor.

In Column 26, Lines 6-7, delete "electricity outlet)," and insert -- electrical outlet), --, therefor.

In Column 26, Line 17, delete "electricity outlet)" and insert -- electrical outlet) --, therefor.

In Column 26, Line 37, delete "UE 17200" and insert -- UE 1700 --, therefor.

In Column 26, Line 46, delete "interchangeable." and insert -- interchangeably. --, therefor.

In Column 26, Line 55, delete "power source 1733," and insert -- transmitter 1733, --, therefor.

In Column 28, Line 12, delete "data file 1727." and insert -- data 1727. --, therefor.

In Column 28, Lines 19-20, delete "high-density digital versatile disc (HD-DVD)" and insert -- high definition digital versatile disc (HD-DVD) --, therefor.

In Column 28, Line 26, delete "identity (SIM/RUIM) module," and insert -- identity module (SIM/RUIM), --, therefor.

In Column 29, Line 59, delete "memory 1890. Memory 1890" and insert -- memory 1890-1. Memory 1890-1 --, therefor.

In Column 30, Line 45, delete "onto" and insert -- into --, therefor.

In Column 30, Line 56, delete "virtual network elements" and insert -- virtual network element --, therefor.

In Column 32, Line 7, delete "embodiments In" and insert -- embodiments. In --, therefor.

CERTIFICATE OF CORRECTION (continued)
U.S. Pat. No. 11,382,137 B2

In Column 33, Line 12, delete "U Es" and insert -- UEs --, therefor.

In Column 33, Line 67, delete "in that" and insert -- such that --, therefor.

In Column 34, Line 55, delete "substep 2330" and insert -- step 2330 --, therefor.

In Column 35, Line 13, delete "microprocessor" and insert -- microprocessors --, therefor.

In Column 35, Line 27, delete "according one" and insert -- according to one --, therefor.

In Column 36, Line 63, delete "method any" and insert -- method of any --, therefor.

In the Claims

In Column 40, Line 50, in Claim 2, delete "CloT," and insert -- CIoT, --, therefor.

In Column 40, Line 53, in Claim 3, delete "CloT" and insert -- CIoT --, therefor.

In Column 40, Line 62, in Claim 5, delete "NB-loT," and insert -- NB-IoT, --, therefor.

In Column 41, Line 19, in Claim 8, delete "CloT," and insert -- CIoT, --, therefor.

In Column 41, Line 22, in Claim 9, delete "CloT" and insert -- CIoT --, therefor.

In Column 41, Line 31, in Claim 11, delete "NB-loT," and insert -- NB-IoT, --, therefor.

In Column 42, Line 19, in Claim 14, delete "CloT," and insert -- CIoT, --, therefor.

In Column 42, Line 23, in Claim 15, delete "CloT" and insert -- CIoT --, therefor.

In Column 42, Line 34, in Claim 17, delete "NB-loT," and insert -- NB-IoT, --, therefor.